United States Patent
Napier et al.

(10) Patent No.: US 11,262,910 B2
(45) Date of Patent: Mar. 1, 2022

(54) SYSTEM AND METHOD FOR PRESENTING AND MANIPULATING A MAP USER INTERFACE

(71) Applicant: Honda Motor Co., Ltd., Tokyo (JP)

(72) Inventors: Parhys L. Napier, Hilliard, OH (US); Michael A. Pilgrim, Dublin, OH (US); Ross Cameron Miller, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 15/868,435

(22) Filed: Jan. 11, 2018

(65) Prior Publication Data
US 2019/0212909 A1    Jul. 11, 2019

(51) Int. Cl.
| | |
|---|---|
| *G06F 3/0485* | (2013.01) |
| *G06F 3/0354* | (2013.01) |
| *G06F 3/0488* | (2013.01) |
| *G01C 21/36* | (2006.01) |
| *G06F 3/0481* | (2013.01) |
| *G06F 3/0483* | (2013.01) |
| *G06F 3/04883* | (2022.01) |
| *G06F 3/04817* | (2022.01) |
| *G06F 3/04886* | (2022.01) |

(52) U.S. Cl.
CPC ....... *G06F 3/04883* (2013.01); *G01C 21/367* (2013.01); *G01C 21/3664* (2013.01); *G06F 3/03547* (2013.01); *G06F 3/0483* (2013.01); *G06F 3/0485* (2013.01); *G06F 3/04817* (2013.01); *G06F 3/04886* (2013.01)

(58) Field of Classification Search
USPC ......................................................... 715/784
See application file for complete search history.

(56) References Cited

U.S. PATENT DOCUMENTS

| | | | |
|---|---|---|---|
| 5,748,185 A * | 5/1998 | Stephan | G06F 3/0488 345/157 |
| 6,240,361 B1 | 5/2001 | Ise et al. | |
| 6,278,940 B1 | 8/2001 | Endo | |
| 6,401,034 B1 | 6/2002 | Kaplan et al. | |
| 6,571,169 B2 | 5/2003 | Miyaki | |
| 6,765,557 B1 * | 7/2004 | Segal | H04N 5/44543 345/173 |

(Continued)

FOREIGN PATENT DOCUMENTS

| | | |
|---|---|---|
| CN | 1691086 | 11/2005 |
| CN | 102200902 | 9/2011 |

(Continued)

*Primary Examiner* — Henry Orr
(74) *Attorney, Agent, or Firm* — Rankin, Hill & Clark LLP

(57) ABSTRACT

A method and system for presenting and manipulating a map user interface include presenting the map user interface in a vehicle tracking mode. The method and system also include changing the map user interface from the vehicle tracking mode to an exploration mode. The method and system additionally include determining a first gesture on the touchpad to pan a scalable map presented on the map user interface at a first speed. The method and system further include determining a second gesture on the touchpad to pan the scalable map presented on the map user interface at a second speed which is faster than the first speed.

19 Claims, 13 Drawing Sheets

(56) References Cited

U.S. PATENT DOCUMENTS

| | | | |
|---|---|---|---|
| 6,957,073 B2 | 10/2005 | Bye | |
| 6,983,203 B1 | 1/2006 | Wako | |
| 7,272,489 B2 | 9/2007 | Tu | |
| 7,317,449 B2* | 1/2008 | Robbins | G06F 3/0481 345/169 |
| 8,649,976 B2 | 2/2014 | Kreft | |
| 8,700,303 B2 | 4/2014 | Uusitalo | |
| 8,706,410 B2 | 4/2014 | Chowanic | |
| 8,723,892 B2 | 5/2014 | Nishiya | |
| 8,924,157 B2 | 12/2014 | Sano et al. | |
| 9,091,546 B2 | 7/2015 | Geelen | |
| 9,122,311 B2* | 9/2015 | Galor | G09G 5/34 |
| 10,402,161 B2* | 9/2019 | Feit | G06F 3/017 |
| 2005/0222760 A1* | 10/2005 | Cabral | G01C 21/3492 701/423 |
| 2007/0171190 A1* | 7/2007 | Wang | G06F 3/0346 345/156 |
| 2009/0289937 A1* | 11/2009 | Flake | G06T 17/05 345/419 |
| 2011/0030502 A1* | 2/2011 | Lathrop | B60K 37/06 74/552 |
| 2011/0047509 A1* | 2/2011 | Arrasvuori | G01C 21/3673 715/815 |
| 2011/0128164 A1* | 6/2011 | Kang | G06F 3/0481 340/995.16 |
| 2012/0007823 A1* | 1/2012 | Ozawa | G06F 3/0236 345/173 |
| 2012/0013548 A1* | 1/2012 | Choi | B60K 35/00 345/173 |
| 2012/0050317 A1* | 3/2012 | Lee | G06F 1/1694 345/619 |
| 2012/0316782 A1* | 12/2012 | Sartipi | G01C 21/367 701/455 |
| 2013/0050131 A1* | 2/2013 | Lee | G08G 1/09626 345/174 |
| 2013/0257742 A1* | 10/2013 | Jones | G09G 5/34 345/173 |
| 2013/0321401 A1* | 12/2013 | Piemonte | G01C 21/3635 345/419 |
| 2013/0325319 A1* | 12/2013 | Moore | G01C 21/36 701/412 |
| 2013/0325341 A1* | 12/2013 | van Os | G01C 21/3611 701/533 |
| 2014/0019917 A1* | 1/2014 | Piemonte | G06F 3/017 715/848 |
| 2014/0365120 A1* | 12/2014 | Vulcano | G01C 21/36 701/532 |
| 2014/0380249 A1* | 12/2014 | Fleizach | G06F 3/017 715/863 |
| 2015/0022465 A1* | 1/2015 | Yamada | G06F 3/04817 345/173 |
| 2015/0095843 A1* | 4/2015 | Greborio | G06F 3/0481 715/784 |
| 2016/0139724 A1* | 5/2016 | Miller | B60K 37/02 345/173 |
| 2017/0363438 A1* | 12/2017 | Wakayanagi | G09B 29/00 |
| 2018/0058877 A1* | 3/2018 | Andrew | G01C 21/3682 |

FOREIGN PATENT DOCUMENTS

| | | |
|---|---|---|
| CN | 102346038 | 2/2012 |
| JP | 2000292194 | 10/2000 |
| JP | 4884689 | 2/2012 |

* cited by examiner

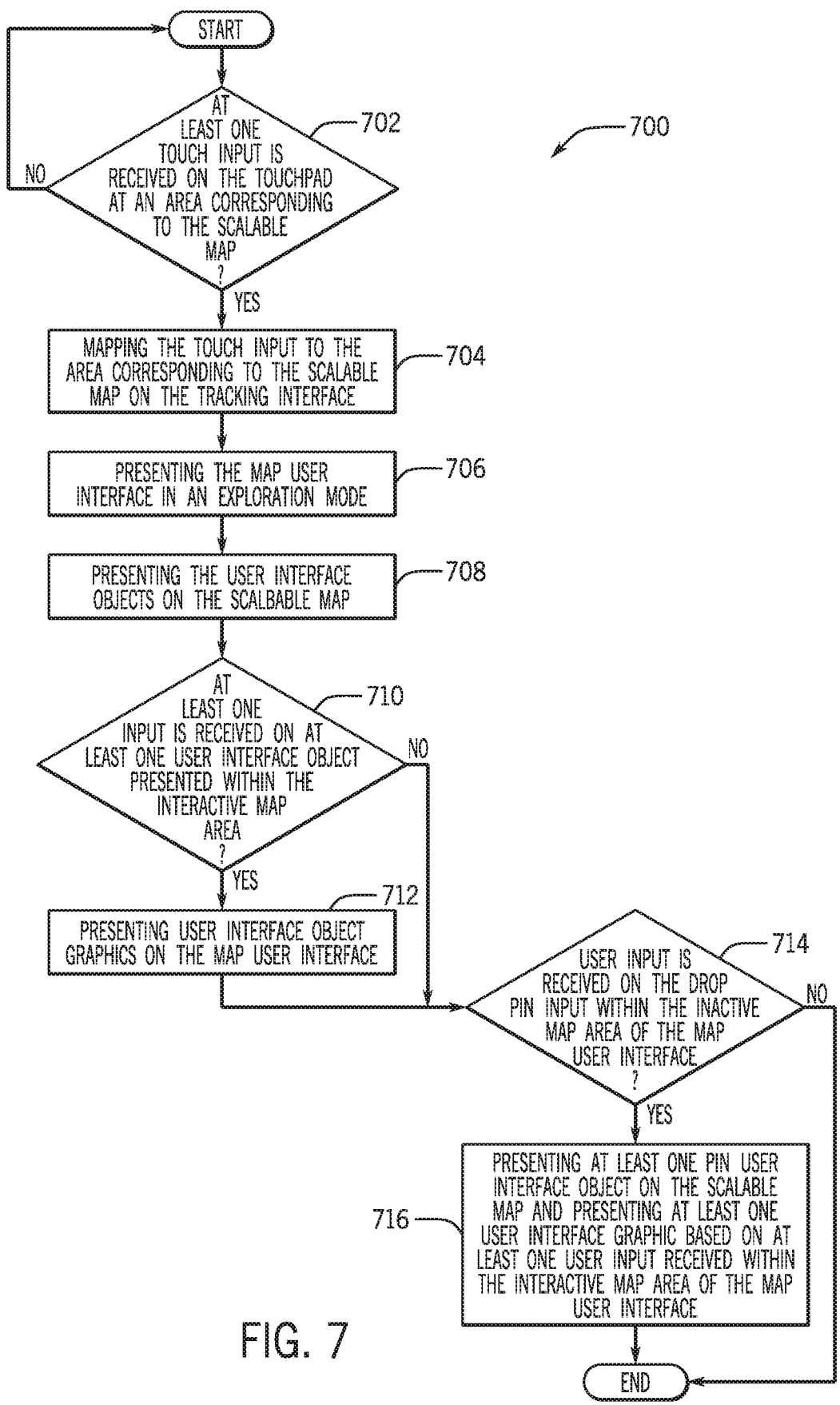

SYSTEM AND METHOD FOR PRESENTING AND MANIPULATING A MAP USER INTERFACE

BACKGROUND

Vehicles are often equipped with one or more display units located at the vehicle dashboard or other area(s) of the vehicle that are utilized to provide various user interfaces to vehicle occupants. Many of the user interfaces have different formats and layouts that present users with various shapes, sizes, and locations of input icons through the one or more display units. Therefore, users that in many cases include a vehicle driver may not be aware that an input is registered to a user interface of the vehicle.

Furthermore, various user interfaces such as navigation system user interface that present a map and associated details require more space than is available on a display screen. Users may need to pan such user interfaces to view areas or specific details of the user interface that are not shown. This limitation may cause the driver to provide multiple inputs to one or more user interface objects and may cause distraction, inefficiency, and frustration for the user, especially in the case of the vehicle driver.

BRIEF DESCRIPTION

According to one aspect, a computer-implemented method for presenting and manipulating a map user interface is provided that includes presenting the map user interface in a vehicle tracking mode. The method also includes changing the map user interface from the vehicle tracking mode to an exploration mode. The map user interface is changed to the exploration mode based on a touch input on a touchpad. The method additionally determining a first gesture on the touchpad to pan a scalable map presented on the map user interface at a first speed. The method further includes determining a second gesture on the touchpad to pan the scalable map presented on the map user interface at a second speed which is faster than the first speed. The first gesture and the second gesture are different from one another.

According to another aspect, a presenting and manipulating a map user interface includes a memory storing instructions when executed by a processor cause the processor to present the map user interface in a vehicle tracking mode. The instructions also cause the processor to change the map user interface from the vehicle tracking mode to an exploration mode. The map user interface is changed to the exploration mode based on a touch input on a touchpad. The instructions additionally cause the processor to determine a first gesture on the touchpad to pan a scalable map presented on the map user interface at a first speed. The instructions further cause the processor to determine a second gesture on the touchpad to pan the scalable map presented on the map user interface at a second speed which is faster than the first speed. The first gesture and the second gesture are different from one another.

According to still another aspect, a computer readable storage medium storing instructions that when executed by a computer, which includes at least a processor, causes the computer to perform a method that includes presenting a map user interface in a vehicle tracking mode. The instructions also include changing the map user interface from the vehicle tracking mode to an exploration mode. The map user interface is changed to the exploration mode based on a touch input on a touchpad. The instructions additionally include determining a first gesture on the touchpad to pan a scalable map presented on the map user interface at a first speed. The instructions further include determining a second gesture on the touchpad to pan the scalable map presented on the map user interface at a second speed which is faster than the first speed. The first gesture and the second gesture are different from one another.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 7 illustrates an exemplary method for presenting the map user interface in the exploration mode from the operating environment of FIG. 1 according to an exemplary embodiment;

DETAILED DESCRIPTION

Figure 1:
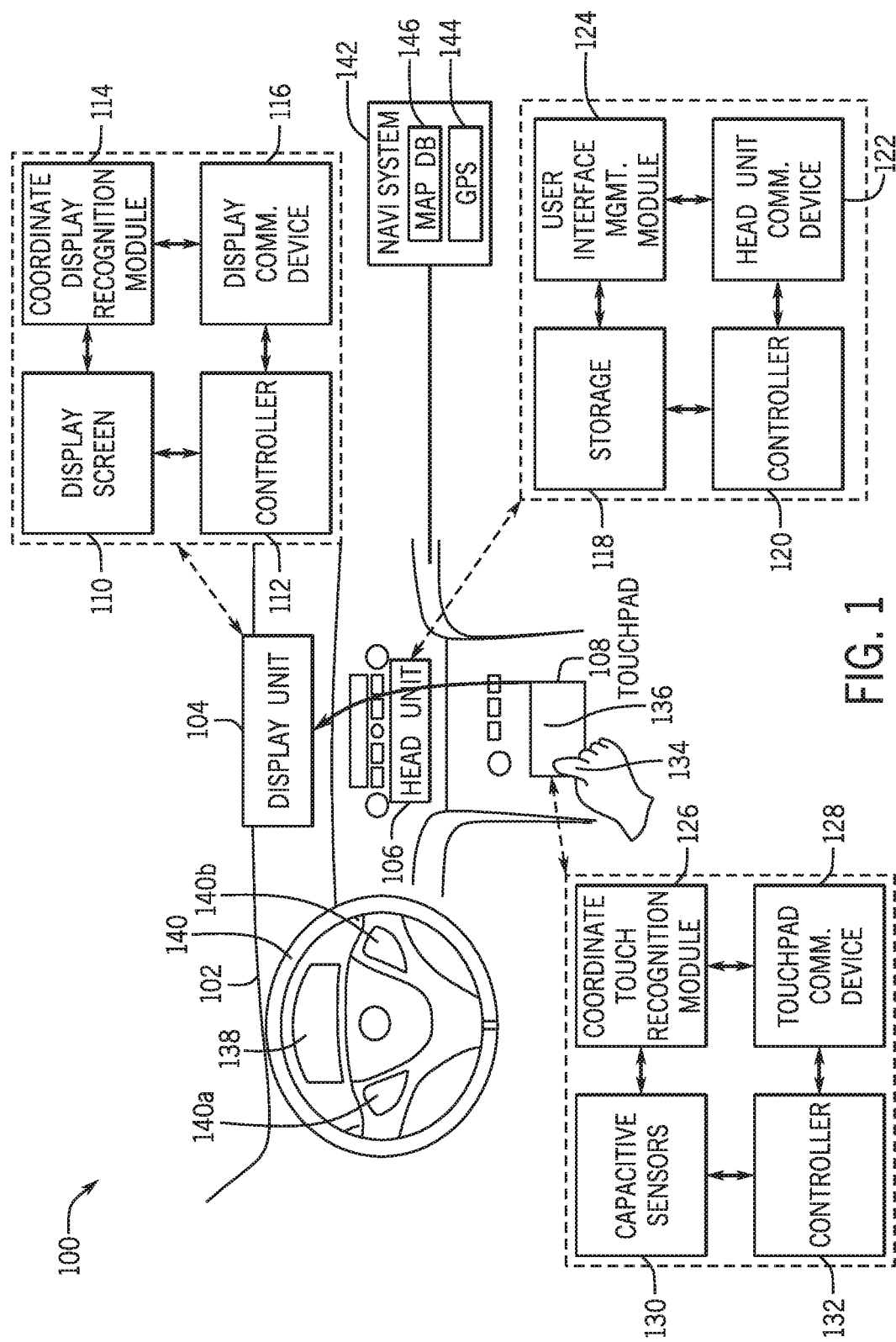
FIG. 1 is a schematic view of a system for presenting a map user interface according to an exemplary embodiment.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus,' as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

An "input device" as used herein may include devices for controlling different vehicle features which are include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

An "output device" as used herein may include devices that may derive from vehicle components, systems, subsystems, and electronic devices. The term "output devices" includes, but is not limited to: display units, and other devices for outputting information and functions.

Referring now to the drawings, wherein the showings are for purposes of illustrating one or more exemplary embodiments and not for purposes of limiting the same, FIG. 1 is a schematic view of a system for presenting a map user interface according to an exemplary embodiment. The system, which may also be referred to as a map user interface presentation system, is generally designated by reference numeral 100. The components included within the system 100 may be interconnected via one or more system buses. It will be understood that FIG. 1 constitutes, in some respects, an abstraction and that the actual organization of the components of the system 100 may be more complex than illustrated. As described in more detailed below, the map user interface presentation system 100 may be utilized to provide a user 134 (e.g., an occupant of the vehicle 102) with an ability to view and interact with the map user interface (shown in FIGS. 6, 8A-8D) that is presented to the user 134 as part of a vehicle human machine interface (vehicle HMI) within the vehicle 102. In particular, the map user interface is presented as a user interface of the vehicle HMI that is associated with a navigation system 142 of the vehicle 102.

As discussed in more detail below, the map user interface presentation system 100 utilizes absolute and zone coordinate mapping that allows the user 134 to touch one or more portions of a surface 136 of a touchpad 108 within the vehicle 102 and provide an input to a corresponding portion of the vehicle HMI and/or one or more vehicle system user interfaces that are presented as part of the vehicle HMI and shown on a display screen 110 of the display unit 104.

As discussed below, the map user interface presentation system 100 also allows the user 134 to provide one or more touch inputs in the form of one or more gestures upon the surface 136 of the touchpad 108 in order to pan a scalable map presented on the map user interface at one or more speeds. Additionally, as discussed below, the map user interface of the vehicle HMI may include various features and functions that may be presented in the form of one or more types of user interface objects, graphics, icons, and/or features, in one or more areas of the map user interface.

Figure 3:
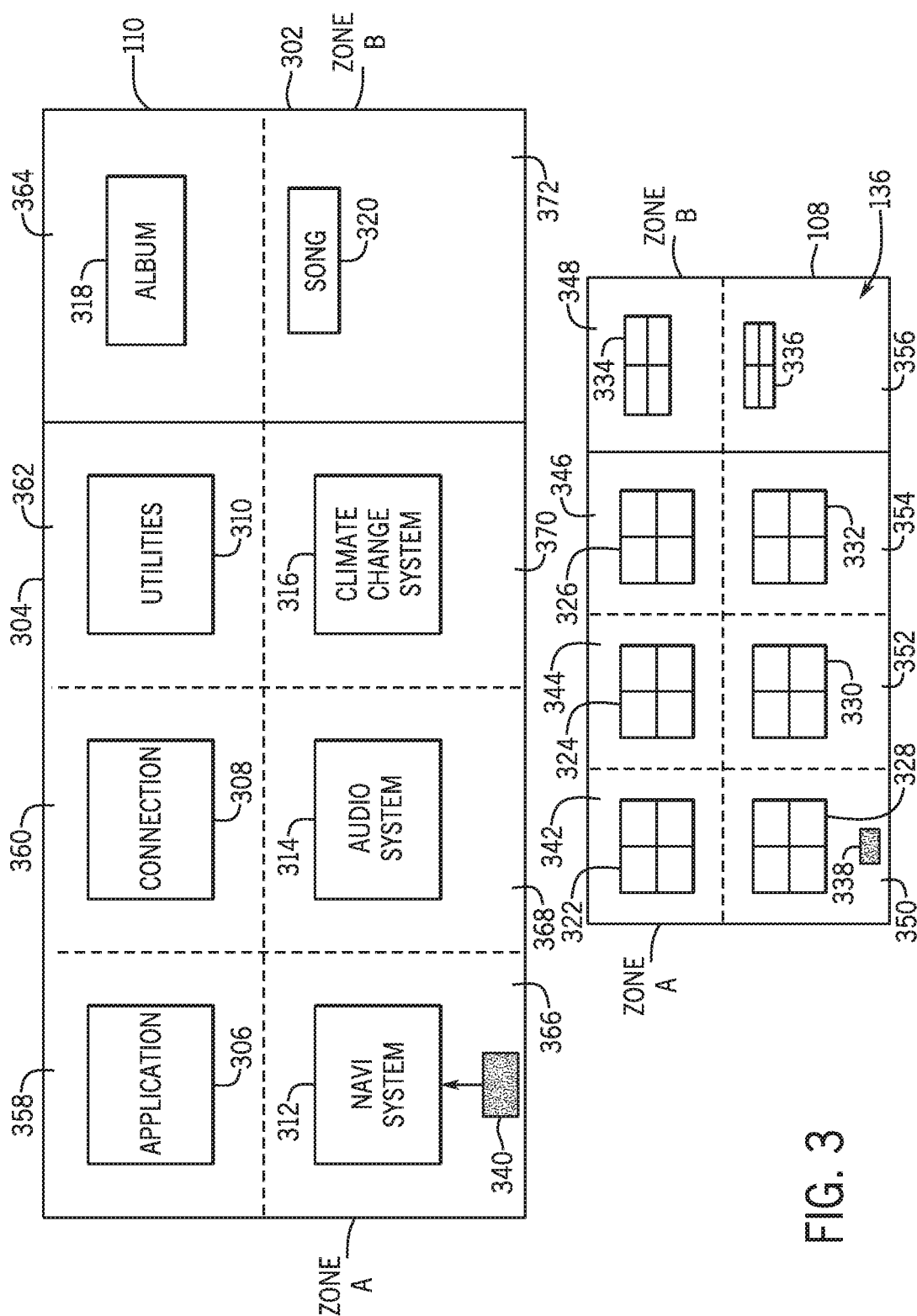
FIG. 3 is a view illustrating absolute coordinate mapping and zone coordinate mapping between the touchpad and a display screen presenting a vehicle HMI according to an exemplary embodiment.

As discussed, the map user interface is included as part of the vehicle HMI (illustrated in FIG. 3). In an exemplary embodiment, the vehicle HMI may be presented in a plurality of interface formats including, but not limited to, a welcome interface, a home interface, a specific vehicle system interface, a vehicle operating system interface, a vehicle application interface, a mobile device application interface, a web based interface, etc.

The map user interface may be presented in one or more specific modes and formats based on commands sent by a head unit 106 of the vehicle 102 and based on data provided by the navigation system 142 of the vehicle 102. In an exemplary embodiment, as discussed in more detail below, the map user interface may be presented in a vehicle tracking mode (illustrated in FIG. 6) that may present a tracking interface that presents a real time location of the vehicle 102 on the scalable map of the location surrounding the vehicle 102. Additionally, upon receipt of a specific input(s), the map user interface may be presented in an exploration mode (illustrated in FIG. 8A-8D). As described below, within the exploration mode, the map user interface may include an interactive map area and an inactive map area that each may include one or more features that may be inputted and/or manipulated by the user 134 based on touch inputs (e.g., gestures) provided on the touchpad 108.

With continued reference to FIG. 1, in one embodiment, the display unit 104 may be located within the center of the dashboard of the vehicle 102 or any other location within the vehicle 102. The vehicle 102 may additionally include a meter display 138 that is disposed behind a steering wheel 140 of the vehicle 102. The meter display 138 may include a dashboard display or an instrument cluster display. In additional embodiments, the vehicle 102 may also include a head up display (HUD) (not shown) that may be projected/disposed upon a windshield (not shown) of the vehicle 102. In one embodiment, the display unit 104, the meter display 138, and/or the HUD may present the vehicle HMI and the vehicle system user interfaces including the map user interface. Additionally, the user 134 may utilize the touchpad 108 and/or one or more steering controls 140a, 140b to provide inputs and/or manipulate the vehicle HMI and the one or more vehicle system interfaces including the map user interface being presented on the display unit 104, the meter display 138, and/or the head up display of the vehicle 102.

In one or more embodiments, the display unit 104 may be configured in a variety of form factors, shapes, sizes, designs, and/or configurations. As will be discussed in more detail below, the display unit 104 is operably connected to the touchpad 108. The touchpad 108 is utilized by the user(s) to provide touch inputs to one or more user interfaces of the vehicle HMI including the map user interface that are executed and stored on the head unit 106 within the vehicle 102.

The exemplary embodiment of the display unit 104 shown in FIG. 1 may include a controller 112, a coordinate display recognition module 114, and a display communication device 116. The display screen 110 may be a flat panel display that may include a liquid crystal display (LCD) device, an electroluminescent display (ELD) device, a field emission display (FED) device, a plasma display panel (PDP), a thin film transistor LCD (TFT-LCD) device, a flexible display unit, an organic light-emitting diode (OLED), an active-matrix organic light-emitting diode (AMOLED), etc. The display screen 110 may be configured in a variety of form factors, shapes, sizes, designs, and/or configurations. For example, the display screen 110 may be configured in a wide or ultra wide format. In an alternate embodiment, the display unit 104 may include a heads up display that projects the display screen 110 upon the windshield of the vehicle 102.

The controller 112 may control the display unit 104 based in part on coordinate data that is received by the display communication device 116. The controller 112 may be any hardware device capable of executing instructions stored within a memory/storage (not shown). As such, the controller 112 may include a microprocessor, field programmable gate array (FPGA), application-specific integrated circuit (ASIC), or other similar devices. The controller 112 may interact with a display driver (not shown) that is utilized to provide images to the display screen 110 based on commands sent by the controller 112. In one embodiment, inherent processing memory (not shown) of the controller 112 may store operational instructions, applications, and/or interfaces that are specific to the display unit 104 and are executed by the controller 112. For example, the controller 112 may execute a display settings user interface as part of the vehicle HMI to be utilized by the user 134 to select settings shown on the display screen 110 such as color, tint, sharpness, format, etc.

The display communication device 116 may be capable of providing wired or wireless computer communications utilizing various protocols to send/receive non-transitory signals internally to the head unit 106 and/or the touchpad 108 and externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system. Additionally, the display communication device 116 may be operably connected for internal computer communications to the head unit 106 and/or touchpad 108 via a bus (e.g., a Controller Area Network (CAN) or a Local Interconnect Network (LIN) protocol bus). In an exemplary embodiment, the display communication device 116 may receive input signals and send output signals to both the head unit 106 and the touchpad 108. In one embodiment, the display communication device 116 may also communicate with external devices in order for the controller 112 to receive inputs to be shown on the display screen 110. For example, the display communication device 116 may communicate via wireless computer communication with the user's portable electronic device (not shown).

The display unit 104 also includes the coordinate display recognition module 114. In one embodiment, the coordinate display recognition module 114 is a separate hardware device that includes a separate processor, memory, storage, or other hardware. In an alternate embodiment, the coordinate display recognition module 114 may be included as part of the controller 112 (i.e., stored within the memory/storage of the controller) to be specifically utilized when executed. In an exemplary embodiment, the coordinate display recognition module 114 is utilized to determine the display coordinate values (display coordinates) of user interface objects that are presented as part of the vehicle HMI (via the head unit 106) and displayed on the display screen 110.

In an exemplary embodiment, the coordinate display recognition module 114 may be utilized to determine the display coordinates of one or more user interface objects. The coordinate display recognition module 114 may identify the display coordinates as being x and y points that contain one or more pixels. The y point may define the vertical side(s) of the display screen 110, and the x point may define the horizontal side(s) of the display screen 110. In one embodiment, the coordinate display recognition module 114 may determine the display coordinates from an origin point being on the left top corner of the display screen 110. For example, based on an exemplary scaling system the "0,0" point is in the upper left corner of the display screen 110, and the "999,999" point is at the lower right corner of the display screen 110. In the example, the display coordinates represent a square shaped display screen, however, the display screen 110 may be configured in any form factor, shape, and/or size (e.g., widescreen, ultra widescreen). Therefore, the coordinate display recognition module 114 may utilize any type of scaling system that may depend on the size and shape of the display screen 110. The coordinate display recognition module 114 may utilize data sent from the touchpad 108 (through the display communication device 116) that includes touchpad coordinates with respect to touch inputs received by the user(s) in order to provide absolute and zone coordinate mapping between the touchpad 108 and the display screen 110.

In the embodiment shown in FIG. 1, the touchpad 108 may be in a form of a rectangular surface that includes the surface 136 that may translate the motion and position of one or more of the user's finger(s) to an absolute position on the display screen 110 of the display unit 104. The surface 136 of the touchpad 108 may be configured in a variety of form factors, shapes, sizes, designs, and/or configurations. For example, the surface 136 may be configured in a wide or ultra-wide format. In one embodiment, the touchpad 108 may provide tactile feedback and/or pressure sensing. For instance, the touchpad 108 may receive an input by increasing the pressure of the user's finger on the surface 136 of the touchpad 108, instead of providing a separate touch input in the form of lifting and tapping the user's finger. In an alternate embodiment, the touchpad 108 may also include a "hot spot" location of the surface 136 of the touchpad 108 that provides specific types of functionality apart from the remaining portion of the surface 136. For example, a "hot spot" location of the surface 136 may include scrolling zones (horizontal and/or vertical scroll bars that are visibly shown on the surface 136 of the touchpad 108) that act as a scroll wheel specifically provided to quickly scroll through user interfaces shown on the display screen 110.

Figure 2:
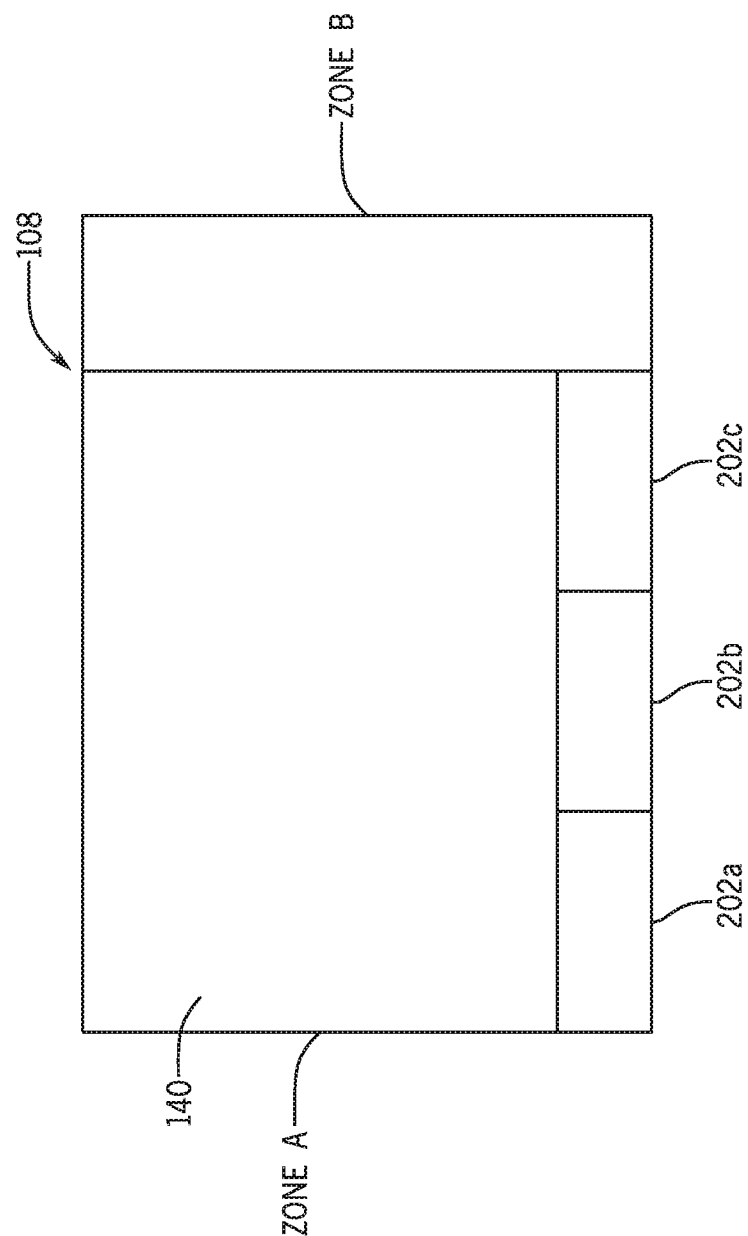
FIG. 2 is a schematic view of an exemplary touchpad according to an exemplary embodiment.

With reference to FIG. 2, in one or more embodiments, the touchpad 108 may include two input zones that may be referred to as Zone A and Zone B. As discussed below, Zone A and Zone B of the touchpad 108 may correspond to similar zones of the vehicle HMI and the one or more vehicle system user interfaces, presented on the display unit 104. As discussed below, the system 100 provides absolute coordinate mapping that allows the user to touch a specific portion of the surface 136 of the touchpad 108 and simultaneously input a corresponding portion of the vehicle HMI at Zone A and/or Zone B being displayed on the display screen 110. In addition, the system 100 provides zone mapping in order for the user 134 to input user interface objects presented at a corresponding portion of the vehicle HMI at Zone A and/or Zone B in a rapid manner without having to touch input a portion of the touchpad 108 that is specifically mapped to the location of a user interface object.

In one embodiment, the touchpad 108 may be configured with a first input button 202a, a second input button 202b, and a third input button 202c that may be inputted by the user 134. It is to be appreciated, that the touchpad 108 may be configured with fewer or greater number of input buttons that may be inputted by the user 134. In some embodiments, the input buttons 202a, 202b, 202c, may be visible as pushable or clickable hard buttons. In alternate embodiments, the input buttons 202a, 202b, 202c may not necessarily be visible until a touch input is received upon the surface 136 of the touchpad 108. In alternate configurations of the touchpad 108, the input buttons 202a-202c may include soft buttons that may be disposed at one or more areas of the surface 136 of the touchpad 108. In some configurations, the input buttons 202a-202c may not be directly disposed upon the surface of the touchpad 108, but may be instead disposed near one or more edges of the surface 136 of the touchpad 108. In one or more embodiments, the one or more input buttons 202a-202c may be included within Zone A of the touchpad 108 and may be utilized to provide one or more types of inputs that are specifically applicable to Zone A of the vehicle HMI. Similarly, one or more input buttons 202a-202c may be included within Zone B of the touchpad 108 and may be utilized to provide one or more types of inputs that are specifically applicable to Zone B of the vehicle HMI.

In an exemplary embodiment, the first input button 304a may be utilized as a home button that is inputted to present a home user interface (shown in FIG. 3) of the vehicle HMI within the vehicle 102. The home interface may be navigated by the user 134 to execute one or more vehicle system user interfaces of the vehicle HMI including the map user interface. Additionally, each of the vehicle system user interfaces may include a default user interface that may be presented to the user as a default starting point and that may be accessed by inputting the first input button 202a of the touchpad 108 when the respective user interface is presented. For example, the user 134 may press the first input button 202a to view a home user interface of the vehicle HMI 302. Additionally, when the map user interface is being presented via the display unit 104, the user 134 may input the first input button 202a to present a tracking interface which may be configured as the default interface of the map user interface. Upon input of the first input button 202a, the map user interface may be put into the vehicle tracking mode and may present the (default) tracking interface, as discussed in more detail below.

In one embodiment, the second input button 202b of the touchpad 108 may be utilized as a back button that is inputted to present a previously presented user interface within the vehicle 102. The previously presented user interface may include an interface that the user 134 previously navigated to when interfacing with the vehicle HMI. In some embodiments, the second input button 202b may be inputted to view a previously presented user interface of the map user interface. For example, the user 134 may press the second input button 202b to view a previously presented user interface of the map user interface that may present a previous view of the scalable map and/or a detailed view that may include point of interest (POI) details, location details, and the like.

In one or more embodiments, the third input button 202c may be utilized as an input button that is specifically applicable to one of the zones of the touchpad 108. In some configurations, the third input button 202c may be inputted to execute a menu of interface cards that may be associated with one or more vehicle system user interfaces that may be displayed in the zone that the third input button 202c is applicable to. For example, the third input button 202c may be inputted to execute a detailed interface card (shown in FIG. 8C) that is associated to a point-of-interest (POI) that is presented on the map user interface. As discussed in more detail below, the detailed interface card may be presented in one of the zones of the vehicle HMI and may provide details associated with one or more particular POIs. It is to be appreciated that the input buttons 202a-202c may be inputted to provide a variety of additional functions that may respectively pertain to the one or more user interfaces as presented as part of the vehicle HMI being displayed on the display screen 110 of the display unit 104.

With reference again to FIG. 1, in an exemplary embodiment, the touchpad 108 may include the coordinate touch recognition module 126, a touchpad communication device 128, capacitive sensors 130, and a controller 132. The capacitive sensors 130 may be capable of determining capacitance to sense the user touch input from the user's finger(s) on the surface 136 of the touchpad 108. In one embodiment, the capacitive sensors 130 may be located at numerous touchpad coordinate locations of the touchpad 108 and are able to sense touch inputs from every touch input provided at every touchpad coordinate location.

In an exemplary embodiment, the capacitive sensors 130 may send a signal corresponding to multiple points of touch input received on the surface 136 of the touchpad 108. The capacitive sensors 130 may be able to sense multi-touch gestures as well as various types of gesturing techniques such as dragging gestures, swiping gestures, scrolling gestures, tapping gestures, swirling gestures, etc. Additionally, the capacitive sensors may be able to sense the touch input position, the touch input speed, the touch input direction, the touch input angle, and the like and may provide respective data to the coordinate touch recognition module 126. The coordinate touch recognition module 126 may aggregate the data received from the capacitive sensors 130 into touchpoint data that represents a manner in which the touch input(s) are provided by the user 134 on the surface 136 of the touchpad 108. Additionally, as described below, the coordinate touch recognition module 126 may communicate the touchpoint data along with touchpad coordinates that correspond to the one or more touch inputs provided by the user 134 to the head unit 106.

In an alternate embodiment, the touchpad 108 may be a resistive touchpad that may not include the capacitive sensors 130. The resistive touchpad may instead include layered sheets that respond to pressure on the surface 136 of the touchpad 108 by contacting one another at specific touchpad coordinate locations based on the touch input of the user's finger(s), a stylus, or other device on the surface 136 of the touchpad 108. In yet an another embodiment, the touchpad 108 may be a conductance touchpad that includes two surfaces with sensors that connect to each other upon receiving the user's touch input at specific touchpad coordinate locations. It is to be appreciated that the resistive touchpad or the conductance touchpad may be configured with sensors that may be able to sense the touch input position, the touch input speed, the touch input direction, the touch input angle, and the like and may provide respective data to the coordinate touch recognition module 126. The coordinate touch recognition module 126 may aggregate the data received from the capacitive sensors 130 into the touchpoint data and may communicate the touchpoint data to the head unit 106.

In an exemplary embodiment, the controller 132 may control the touchpad 108 based in part on touch inputs received at touchpad coordinate location(s) that are sensed by the capacitive sensors 130 and/or inputs received by one or more of the input buttons 202a-202c of the touchpad 108. The controller 132 may be any hardware device capable of executing instructions stored within a memory/storage (not shown). As such, the controller 132 may include a microprocessor, field programmable gate array (FPGA), application-specific integrated circuit (ASIC), or other similar devices. The controller 132 may interact with a touchpad driver (not shown) that may interpret the user's touch inputs on the surface 136 of the touchpad 108.

In one embodiment, the controller 132 may evaluate touch inputs received on the surface 136 of the touchpad 108. Specifically, upon sensing of the touch input(s) from the user's finger touching the surface 136 of the touchpad 108, the capacitive sensors 130 may send one or more touch input signals to the controller 132 indicating the presence of the touch input(s) on the touchpad 108. In an exemplary embodiment, the controller 132 of the touchpad 108 may utilize instructions stored within inherent processing memory (not shown) of the controller 132 to provide commands to control and operate components of the touchpad 108 such as the coordinate touch recognition module 126.

In one embodiment, the coordinate touch recognition module 126 may include a separate hardware device that includes a separate processor, memory, storage, or other hardware. In an alternate embodiment, the coordinate touch recognition module 126 may be included as part of the controller 132 (i.e., stored within the inherent processing memory of the controller 132) to be specifically utilized when executed. In an exemplary embodiment, the coordinate touch recognition module 126 may be utilized to determine the touchpad coordinates of touch input(s) that are registered by the controller 132 and the touchpoint data that pertains to the touch input position, the touch input speed, the touch input direction, the touch input angle, and the like of the touch inputs(s) as discussed above. Specifically, upon the capacitive sensors 130 sensing the user's finger(s) touching the surface 136 of the touchpad 108, the controller 132 may register the touch input and may provide the touch input as raw data to the coordinate touch recognition module 126. The controller 132 may utilize the coordinate touch recognition module 126 to determine the touchpad coordinates of the touch input(s) on the surface 136 of the touchpad 108 and the touchpoint data that corresponds to the touch input(s).

In one embodiment, the coordinate touch recognition module 126 may identify the touchpad coordinates as being x and y points (corresponding to a horizontal and vertical axis) that contain one or more capacitive sensors 130. The y point may define the vertical side(s) of the touchpad 108, and the x point may define the horizontal side(s) of the touchpad 108. In one embodiment, the coordinate touch recognition module 126 may determine the touchpad coordinates from an origin point being on the left top corner of the surface 136 of the touchpad 108. For example, based on an exemplary scaling system, the "0,0" point is in the upper left corner of the touchpad 108, and the "399,399" point is at the lower right corner of the touchpad 108. In this example, the touchpad coordinates represent a square shaped touchpad, however, the touchpad 108 may be configured in any form factor, shape, and/or size (e.g., wide, ultra-wide). Therefore, the coordinate touch recognition module 126 may utilize any type of scaling system that may depend on the size and shape of the touchpad 108.

The touchpad communication device 128 may be capable of providing wired or wireless computer communications utilizing various protocols to send/receive non-transitory signals internally to the head unit 106 and/or the display unit 104 and externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system.

The touchpad communication device 128 may be operably connected for internal computer communications to the head unit 106 and/or display unit 104 via a bus. In one embodiment, the touchpad communication device 128 may receive input signals and send output signals to both the head unit 106 and the display unit 104. In an alternate embodiment, the touchpad communication device 128 may also communicate with vehicle systems in order for the controller 132 to send inputs to various vehicle systems and subsystems. For example, the touchpad communication device 128 may communicate directly with the navigation system 142 to provide input commands that are utilized for providing specific types of navigation system functionality.

In one embodiment, the coordinate touch recognition module 126 may provide the touchpad coordinates and touchpoint data to be utilized by the head unit 106 to provide a user input(s) at an absolute mapped position or a zone mapped position at one or more portions of the vehicle HMI and the vehicle system user interfaces including the map user interface. In an alternate embodiment, the touchpad communication device 128 may communicate directly with the display communication device 116 in order for the coordinate touch recognition module 126 to provide the touchpad coordinate values to the coordinate display recognition module 114.

With specific reference to the head unit 106 of the vehicle 102, the head unit 106 may include a storage 118, a controller 120, a head unit communication device 122, and a user interface management module 124. In one embodiment, the coordinate touch recognition module 126 of the touchpad 108 may provide the touchpad coordinates corresponding to the touch input(s) received by the user 134 on the surface 136 of the touchpad 108 and related touchpoint data to the user interface management module 124 of the head unit 106. More specifically, the user interface management module 124 may interpret touchpad coordinates of touch input(s) received by the user 134 on the touchpad 108 and associated touchpoint data that may determine the manner of the touch input(s) being inputted by the user on the surface 136 of the touchpad 108. Upon interpreting the touchpad coordinates of the touch input(s) and the associated touchpoint data, the user interface management module 124 may execute specific inputs to the vehicle HMI and the vehicle system user interfaces including the map user interface based on absolute coordinate mapping or zone coordinate mapping between the touchpad 108 and the display screen 110.

In one embodiment, the storage 118 of the head unit 106 may include various memories such as, for example L1, L2, or L3 cache or system memory. As such, the memory may include static random access memory (SRAM), dynamic RAM (DRAM), flash memory, read only memory (ROM), or other similar memory devices. The storage 118 may be utilized to store one or more operating systems, applications, associated operating system data, application data, vehicle system and subsystem user interface data, and the like that are executed by the controller 120. In one or more embodiments, the storage 118 may store data that may include user interface data that pertains to the vehicle HMI.

The controller 120 may be any hardware device capable of executing instructions stored within a memory/storage (not shown). As such, the controller 120 may include a microprocessor, field programmable gate array (FPGA), application-specific integrated circuit (ASIC), or other similar devices. In an exemplary embodiment, the controller 120 may be utilized to execute one or more user interfaces including the vehicle HMI that may be associated with the operating systems, applications, vehicle systems and subsystems. In one embodiment, the controller 120 may include an electronic control unit (not shown) of the vehicle 102 that may be utilized to control any and all electronic components located within the vehicle 102. In yet an alternate embodiment, the controller 120 may control the display unit 104 and/or the touchpad 108 in lieu of separate respective controllers 112, 132 included therein.

The head unit communication device 122 may be capable of providing wired or wireless computer communications utilizing various protocols to send/receive non-transitory signals internally to the display unit 104 and/or the touchpad 108 and externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system. Additionally, the head unit communication device 122 may be operably connected for internal computer communications to the display unit 104 and/or touchpad 108 via a bus. In one embodiment, the head unit communication device 122 may also communicate with external devices in order for the controller 120 to execute computer program instructions located on an external device. For example, the head unit communication device 122 may communicate via wireless computer communication with the user's portable electronic device in order to execute an infotainment application that is stored on the user's portable electronic device through the vehicle infotainment system (not shown) to be displayed through the display unit 104.

With continued reference to FIG. 1, the user interface management module 124 of the head unit 106 may evaluate the touchpad coordinates and the touchpoint data to provide one or more respective user interface, objects, graphic animations, features, background graphics, icon graphics, interface cards, etc., at one or more areas of the Zone A and Zone B of the vehicle HMI and the vehicle system user interfaces including the map user interface. As discussed below, with respect to the map user interface, upon receipt of the touchpad coordinates the coordinate touch recognition module 126 may provide one or more respective data signals to the user interface management module 124 to provide interfaces, graphical formats, pop-up objects, user interface cards, and input objects associated with the vehicle tracking mode and the exploration mode of the map user interface included as part of the vehicle HMI. Additionally, the user interface management module 124 may provide one or more functions that may be utilized with respect to the map user interface, the interactive map area, the inactive map area, and/or the scalable map presented on the map user interface, that include, but are not limited to, a zoom in function, a zoom out function, a panning function, an object selection function, a drop pin function, a current position return function, a map layering function, and a map orientation function.

In an exemplary embodiment, the head unit communication device 122 may communicate with a plurality of vehicle systems (not shown) to send and receive data signals pertaining to vehicle system data. In particular, the head unit communication device 122 may communicate with the navigation system 142 of the vehicle 102 to receive one or more data signals that pertain to data is provided to the user interface management module 124 to present the modes, the scalable map, graphical formats, user interface objects, background graphics, and the like of the map user interface.

FIG. 3 is a view illustrating absolute and zone coordinate mapping between the touchpad 108 and the display screen 110 presenting the vehicle HMI 302 according to an exemplary embodiment. As shown, the display screen 110 displays an exemplary home interface 304 of the vehicle HMI 302 that is presented from the head unit 106 of the vehicle 102. Specifically, in the illustrative example shown, the home interface 304 is presented as a vehicle system/function interface menu that may be utilized by the user 134 to navigate to one or more vehicle system user interfaces and/or functions. It is to be appreciated that the vehicle HMI 302 and the home interface 304 illustrated in FIG. 3 is an exemplary embodiment and that the vehicle HMI 302 and home interface 304 may be presented in a variety of formats that include various colors, opacity, line formats, object sizes object shapes, frame rates, stroke styles, backgrounds, background animations, object selection animations, and the like.

The vehicle HMI 302 may include user interface objects 306-320 that may be inputted to present one or more respective vehicle system user interfaces. For example, the navigation system user interface object 312 may be inputted by the user 134 via the touchpad 108 to present the map user interface as part of the vehicle HMI 302. It is to be appreciated that the vehicle HMI 302 may include fewer or greater number of user interface objects than those illustrated in FIG. 3. It is also to be appreciated that the user interface objects presented on the home interface 304 of the vehicle HMI 302 may correspond to alternate vehicle systems, vehicle functions, applications, and the like than those illustrated in FIG. 3. For example, the user interface objects 306-320 may be associated with applications that may be executed and stored on the storage 118 of the head unit 106. In additional embodiments, the vehicle HMI 302 may be extended to be presented on the meter display 138 or the HUD and may include matching user interface objects to the user interface objects 306-320.

As described above, the vehicle HMI 302 may be divided into Zone A and Zone B for displaying one or more of the user interface objects 306-320. Zone A and Zone B may present one or more different types of interfaces of the vehicle HMI 302 that may pertain to different operating systems, applications, vehicle systems, and the like. Additionally, interfaces, objects, and/or graphics presented within Zone A and Zone B may be inputted and/or manipulated based on touch inputs provided by the user 134 on respective zones of the touchpad 108 (illustrated in FIG. 2 and discussed above). For example, as shown, Zone A may include the user interface objects 306-316 that may be inputted by the user 134 to access vehicle system user interfaces based on touch inputs received at respective areas of Zone A of the touchpad 108. Additionally, Zone B may include user interface objects 318, 320 that pertain to a specific user interface, application, and/or vehicle system that may be inputted by the user 134 based on touch inputs received at respective areas of Zone B of the touchpad 108.

With continued reference to FIG. 3, with absolute coordinate mapping being utilized between the touchpad 108 and the display screen 110, touchpad coordinates that correspond to the display coordinate areas on the display screen 110 where the user interface objects 306-316 are presented are utilized as active touchpad coordinate areas 322-336. In other words, the touchpad 108 may be utilized to directly input the user interface objects 306-320 when the user 134 touch inputs the portion of the surface 136 of the touchpad 108 at the respective active touchpad coordinate areas 322-336. For example, if the user's finger touches the surface 136 of the touchpad 108 at the active touchpad coordinate area 328, the touch input will be registered at the corresponding display coordinate areas of the display screen 110 presenting the navigation system user interface object 312 that pertains to "navigation system" in order to execute and present the map user interface as part of the vehicle HMI 302 on the display screen 110.

Zone coordinate mapping allows the user to quickly and efficiently provide one or more touch inputs to user interface objects 306-320 by touching any portion of the touchpad 108. In other words, zone coordinate mapping mode allows the user 134 to provide inputs to one or more user input objects 306-320 displayed on the display screen 110, even if the user's touch input does not occur at active touchpad coordinate areas 322-336 of the touchpad 108. For example, the user 134 may be able to provide inputs to user interface objects 306-320 of the vehicle HMI 302 without having to specifically touch the surface 136 of the touchpad 108 at active touchpad coordinate areas 322-336.

As illustrated in the example shown in FIG. 3, the user 134 may provide a touch input 338 on the surface 136 of the touchpad 108 that is outside of the active touchpad coordinate areas 322-336. The touch input received in areas of the surface 136 of the touchpad 108 that are not determined to be active touchpad coordinates of the touchpad 108 (that are not mapped via absolute coordinate mapping to user interface objects 308-318 at the active touchpad coordinate areas 322-336) may also be utilized to provide inputs to the user interface objects 308-322 presented on the home interface 304 of the vehicle HMI 302 (in addition to the active touchpad coordinate areas 322-336). For example, as depicted in FIG. 3, zone coordinate mapping allows the user to efficiently provide the touch input 338 to the navigation system user interface object 312 without having to specifically touch input the active touchpad coordinate area 328 corresponding to the navigation system user interface object 312. Therefore, the touch input 338 at touch input zone 350 that corresponds to the placement of a user interface input 340 within display input zone 366 is utilized to provide a user input to the navigation system user interface object 312. As shown, display input zones 358-372 may be provided that are associated to each of the user interface objects 306-320 and that correspond to touch input zones 344-356 via zone coordinate mapping. The touch input zones 342-356 may be utilized to provide inputs to the user interface objects 306-320 without the user 134 having to specifically input the active touchpad coordinate areas 322-336. It is to be appreciated that the zone coordinate mapping may be executed in a dynamic matter based on the layout of the user interface(s) presented on the display screen 110. For example, if the vehicle HMI 302 includes only one user interface object 306, then the zone coordinate mapping may include the touch input zone 342 as including the entirety of the surface 136 of the touchpad 108. Similarly, if the vehicle HMI 302 includes two user interface objects 306, 308 then the zone coordinate mapping may include the touch input zones 342, 344 that may each respectively each utilize half of the entirety of the surface 136 of the touchpad 108. It is also to be appreciated that the touch input zones may be configured in various dimensions and/or in various shapes that may be dependent on the dimensions and shapes of each of the user interface objects 306-320 presented of the vehicle HMI 302 presented on the display screen 110.

As discussed above, the touchpad 108 may physically or virtually be divided into two areas, Zone A and Zone B, which both map to respective areas of the vehicle HMI presented on the display screen 110. Specifically, Zone A of the touchpad 108 maybe mapped to Zone A of the vehicle HMI 302 such that any inputs received on the touchpad 108 at Zone A will be absolutely mapped to a corresponding location at Zone A of the vehicle HMI 302 presented on the display screen 110. Similarly, Zone B of the touchpad 108 maybe mapped to Zone B of the vehicle HMI 302 such that any inputs received on the touchpad 108 at Zone B will be absolutely mapped to a corresponding location at Zone B of the vehicle HMI 302 presented on the display screen 110. In some embodiments, each zone is independently clickable. For example, the user 134 may rest their finger on Zone A of the touchpad 108 to provide a first input and push down with their finger causing a click to provide a second input. The user 134 may also place their finger on Zone B of the touchpad 108 to provide a third input and push down with the finger causing a click to provide a fourth input.

In some embodiments, the user 134 may provide inputs based on utilizing an angle of the user's finger, such that an input that is registered as a right sided input may be provided with a right hand or a right side of the user's finger, and an input that is registered as a left sided input may be provided with a left hand or a left side of the user's finger. Additionally, the user 134 may provide the dragging inputs or the swiping inputs that may include left/right sided dragging/swiping inputs or left/right sided dragging/swiping inputs that may be registered as a respective left/right sided input. It is to be appreciated that these inputs are in addition to other gesture related inputs (e.g., moving the finger while it is resting on the surface 136 of the touchpad 108) that may be completed on the touchpad 108. In an exemplary embodiment, the types of inputs provided by the user 134 that include the angle, direction, position, and speed of the touch input may be aggregated by the coordinate touch recognition module 126 as the touchpoint data and may further be provided to the user interface management module 124 of the head unit 106 to provide one or more respective views, graphics, and/or user interface objects upon the vehicle HMI 302 and one or more vehicle system user interfaces including the map user interface.

In an exemplary embodiment, once the user 134 provides one or more touch inputs on the one or more user interface objects 306-316 of the vehicle HMI 302, the coordinate touch recognition module 126 may communicate the one or more touchpad coordinates and touchpoint data to the user interface management module 124. The user interface management module 124 may register the user input(s) and may send one or more commands based on the user input. This touchpad coordinates and touchpoint data may also be analyzed to provide respective graphic animations, graphical objects, and the like at specific portions of the vehicle HMI 302 and the vehicle system user interfaces including the map user interface that are based on absolute and zone coordinate mapping.

Referring to the navigation system 142 shown in FIG. 1, in one embodiment, the navigation system 142 of the vehicle 102 may include a global positioning system 144 (GPS) that may be configured to determine real-time global positioning coordinates of the vehicle 102. In some embodiments, the GPS 144 may be configured as a differential global positioning system that may be provide real-time locational accuracy with respect to the real-time global positioning coordinates of the vehicle 102. In some embodiments, the GPS 144 may send real time GPS data signals to the user interface management module 124. The user interface management module 124 may interpret the real time GPS data signals and may present the map user interface that includes the scalable map that may be scaled to represent different layers, distances, and/or environments. The scalable map may be overlaid with a graphical indication that represents the real-time location of the vehicle 102 upon the representation of the scalable map of the surrounding environment of the vehicle 102. In other words, real time GPS data signals provided by the GPS 144 of the navigation system 142 may be provided to the user interface management module 124 to present the map user interface with the representation of the real-time location of the vehicle 102 on the scalable map of the surrounding area of the vehicle 102.

The navigation system 142 may include or may be operably connected to a map database 146. The map database 146 may store mapping information of one or more regions, environments, and locations that may include the surrounding location of the vehicle 102. In particular, the map database 146 may include, but is not limited to, road network data, landmark data, POI data, street view data, political boundary data, etc. As described below, the map database 146 may be accessed to acquire real time data associated with roads, landmarks, points of interests, etc. based on one or more inputs (e.g., touch inputs) provided by the user 134.

In one or more embodiments, the user 134 may utilize the map user interface to input a desired destination address, POI location, location information, and the like to input a desired destination. Upon inputting of such data, the user interface management module 124 may communicate the desired destination to the navigation system 142 in the form of one or more data signals. The navigation system 142 may employ the GPS 144 and the map database 146 to determine turn by turn directions to the desired destination and may provide respective data signals to the user interface management module 124 to provide turn by turn navigational directions and other details regarding locations within a predetermined vicinity of the vehicle 102 via the scalable map presented through the map user interface.

Figure 4:
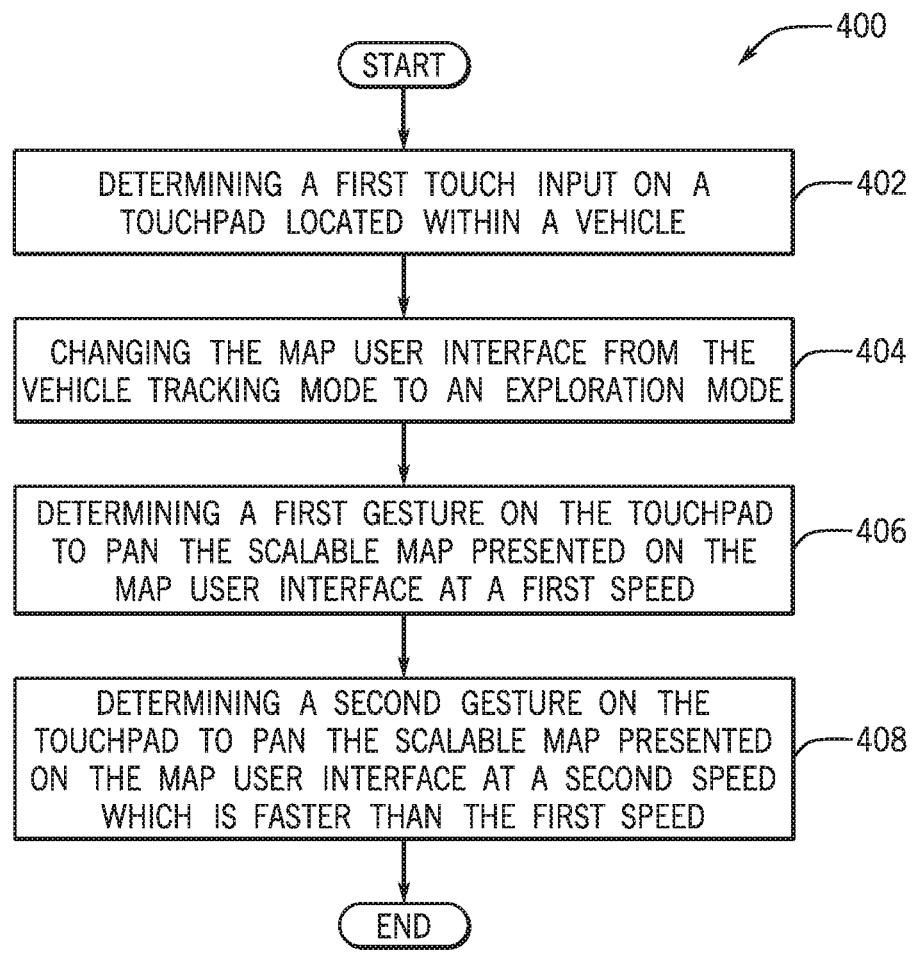
FIG. 4 illustrates an exemplary method for presenting a map user interface from the operating environment of FIG. 1 according to an exemplary embodiment.
Figure 5:
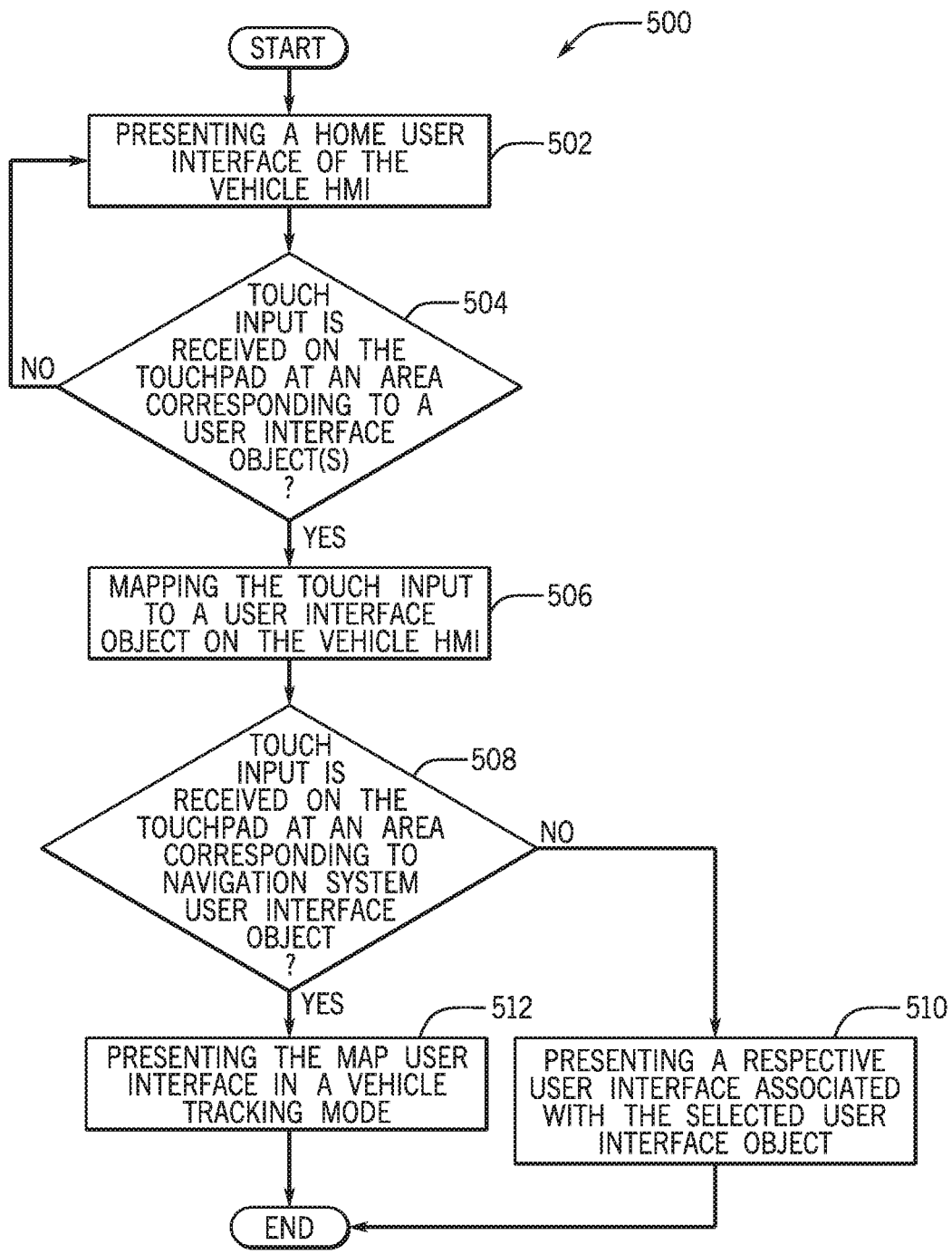
FIG. 5 illustrates an exemplary method for determining a first touch input on the touchpad and presenting the map user interface in a vehicle tracking mode from the operating environment of FIG. 1 according to an exemplary embodiment.

FIG. 4 illustrates an exemplary method 400 for presenting the map user interface from the operating environment of FIG. 1 according to an exemplary embodiment. The method 400 may begin at block 402 wherein the method 400 may include determining a first touch input on a touchpad 108 located within a vehicle 102. FIG. 5 illustrates an exemplary method 500 for determining a first touch input on the touchpad 108 and presenting the map user interface in the vehicle tracking mode from the operating environment of FIG. 1 according to an exemplary embodiment.

The method 500 may begin at block 502, wherein the method 500 includes presenting a home user interface of the vehicle HMI 302. In an exemplary embodiment, the home interface of the vehicle HMI 302 may be presented via the display screen 110 upon enablement of an ACC and/or an ignition mode of the vehicle 102. More specifically, upon initialization of the vehicle HMI 302, the user interface management module 124 may send respective data signal(s) to the coordinate display recognition module 114 to render and present the vehicle HMI 302 on the display screen 110 of the display unit 104. As discussed above, with respect to FIG. 3, the home interface 304 of the vehicle HMI 302 may include user interface objects 306-320 that may be inputted to present one or more respective vehicle system user interfaces to the user 134 upon touch input of a corresponding the active touchpad coordinate area(s) 322-336 of the touchpad 108.

The method 500 may proceed to block 504, wherein the method 500 includes determining if a touch input is received on the touchpad 108 at an area corresponding to a user interface object(s) 306-320. In one embodiment, upon initialization of the vehicle HMI 302, the user interface management module 124 may send respective data signal(s) to the coordinate touch recognition module 126. The coordinate touch recognition module 126 may interpret the data signal(s) and may provide active touchpad coordinate areas 322-336 and touch input zones 342-356 that may be utilized to provide inputs to the user interface objects 306-320. Upon providing the active touchpad coordinate areas 322-336 and the touch input zones 342-356, the coordinate touch recognition module 126 may determine when the user 134 provides at least one touch input at one of the active touchpad coordinate areas 322-336 or the touch input zones 342-356 on the surface 136 of the touchpad 108.

If it is determined that the touch input is received (at block 504), the method 500 may proceed to block 506, wherein the method 500 may include mapping the touch input to a user interface object on the vehicle HMI 302. Upon receiving at least one touch input at one of the active touchpad coordinate areas 322-336 or the touch input zones 342-356, the user interface management module 124 may map the at least one touch input to a respective user interface object 306-320 presented on the home interface 304 of the vehicle HMI 302.

The method 500 may proceed to block 508, wherein the method 500 may include determining if a touch input is received on the touchpad 108 at an area corresponding to the navigation system user interface object 312. In one embodiment, upon receiving the data signal(s) from the coordinate touch recognition module 126 that are indicative of the at least one touch input provided by the user 134 upon the surface 136 of the touchpad 108, the user interface management module 124 may interpret the data signal(s) and may determine execution instructions associated with each of the user interface objects 306-320 presented on the home interface 304. In one embodiment, based on the data signal(s) received from the coordinate touch recognition module 126, the user interface management module 124 may determine if the user 134 provided the touch input at the active touchpad coordinate area 328 or within the touch input zone 350 to execute the map user interface as part of the vehicle HMI 302 based on the input of the navigation system user interface object 312.

If it is determined that the touch input is not received on the touchpad 108 at the area corresponding to the navigation system user interface object 312 (at block 508), the method 500 may proceed to block 510, wherein the method 500 may include presenting a respective user interface associated with the selected user interface object. Upon receiving the data signal(s) from the coordinate touch recognition module 126 indicative of the at least one touch input received on the surface 136 of the touchpad 108, the user interface management module 124 may interpret the data signal(s) and may execute the underlying vehicle system, application, or function user interface that corresponds to the user interface object 306-310, 314-320 selected by the user 134 based on the at least one touch input provided on the respective active touchpad coordinate areas 322-326, 330-336 or the touch input zones 342-348, 352-356. For example, if it is determined that the user 134 touch inputted the touch input zone 354 on the surface 136 of the touchpad 108, the user interface management module 124 may execute an underlying climate change system user interface that may be presented in place of the home interface 304 of the vehicle HMI 302 via the display screen 110.

If it is determined that the touch input is received on the touchpad 108 at the area corresponding to the navigation system user interface object (at block 508), the method 500 may proceed to block 512, wherein the method 500 may include presenting the map user interface in a vehicle tracking mode. In one embodiment, upon receiving the data signal(s) from the coordinate touch recognition module 126 indicative of the at least one touch input received on the surface 136 of the touchpad 108, the user interface management module 124 may interpret the data signal(s) and may determine that the at least one touch input was provided on the active touchpad coordinate area 328 or the touch input zone 350. The user interface management module 124 may execute the map user interface that corresponds to the navigation system user interface object 312. Upon executing the map user interface, the map user interface may be presented as part of the vehicle HMI 302 in the vehicle tracking mode on the display screen 110.

Figure 6:
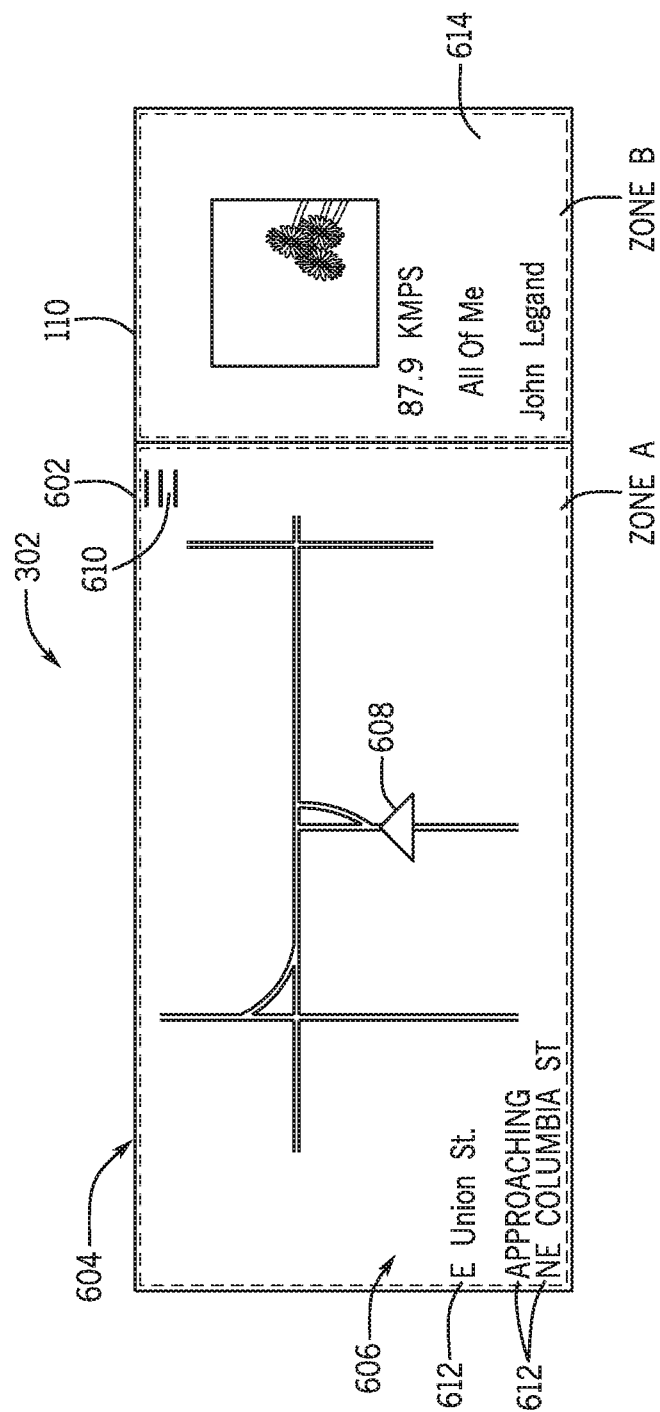
FIG. 6 is an exemplary illustration of the map user interface that is presented as part of the vehicle HMI in a vehicle tracking mode according to an exemplary embodiment.

FIG. 6 is an exemplary illustration of the map user interface 602 that is presented as part of the vehicle HMI 302 in a vehicle tracking mode according to an exemplary embodiment. It is to be appreciated that the map user interface 602 illustrated in FIG. 6 is an exemplary embodiment and that the map user interface 602 may be presented in a variety of formats that include various colors, opacity, line formats, object sizes object shapes, frame rates, stroke styles, backgrounds, background animations, object selection animations, and the like. In an exemplary embodiment, the vehicle tracking mode may include a tracking interface 604 of the map user interface 602. In other words, the vehicle tracking mode may be initialized upon execution of the map user interface 602 by the user interface management module 124 and the tracking interface 604 of the map user interface 602 may be presented via the display screen 110. Additionally, the vehicle tracking mode may be presented upon the input of user 134 upon the first input button 202*a* of the touchpad 108 to present the tracking interface 604 of the map user interface 602. When the map user interface 602 is presented within the vehicle tracking mode, the user interface management module 124 may present the scalable map 606 upon the tracking interface 604.

In one embodiment, within the vehicle tracking mode, the map user interface 602 may be presented within Zone A of the vehicle HMI 302 while another vehicle system, application, or function user interface is presented in Zone B of the vehicle HMI 302. For example, as shown within the exemplary illustration of FIG. 6, Zone A of the vehicle HMI 302 may include the map user interface 602, while Zone B includes an audio system user interface 614 associated with an audio system (not shown) of the vehicle 102. In alternate embodiments, the map user interface 602 may be presented within Zone B of the vehicle HMI 302 while another vehicle system, application, or function user interface is presented within Zone A of the vehicle HMI 302.

In some embodiments, the map user interface 602 may include an extend user interface icon (not shown) that may be utilized to extend the map user interface 602 across both Zones A and B of the vehicle HMI 302. Consequently, upon the input of the extend user interface icon, the map user interface 602 may be presented across the vehicle HMI 302 such that it is presented across the entire display screen 110. In yet an additional embodiment, the map user interface 602 may include a sub-map user interface (not shown) that may be presented within Zone B of the vehicle HMI 302 that may present details provided by the navigation system 142. For example, the sub-map user interface may include a zoomed view of the vehicle 102, details regarding the surrounding location of the vehicle 102, details regarding POIs that are located within a predetermined vicinity of the vehicle 102, traffic information, and the like that is presented within Zone B of the vehicle HMI 302 during the vehicle tracking mode.

In an exemplary embodiment, the map user interface 602 may receive touch inputs at one or more portions of the tracking interface 604 based on touch inputs provided by the user 134 on the surface 136 of the touchpad 108 and/or on the display screen 110. Such touch inputs may include, but may not be limited to tapping touch inputs, dragging touch inputs, swiping touch inputs, pinching touch inputs, etc. In particular, absolute and zone coordinate mapping may be utilized by the coordinate touch recognition module 126 and the user interface management module 124 in a similar manner as discussed above with respect to FIG. 3. In particular, absolute and zone coordinate mapping may be applied based on the presentation of portions of the map user interface 602 and/or additional user interfaces presented in Zones A and B of the vehicle HMI 302 that may be input by the user 134. For example, the user 134 may provide touch inputs (e.g., dragging touch inputs) at one or more areas of the scalable map 606 to change a scale of the scalable map 606 to a different aspect, view, and/or detail with respect to the tracking of the vehicle 102. Thus, the scalable map 606 may be controlled by the user 134 based on one or more touch input gestures to be scaled to represent different layers, distances, and/or environments. For instance, the scalable map 606 may be viewed in a zoomed-in or zoomed-out format based the receipt of one or more pinching in or pinching out gestures on the touchpad 108, as interpreted by the coordinate touch recognition module 126 and communicated to the user interface management module 124.

In one or more embodiments, within the vehicle tracking mode, the tracking interface 604 of the map user interface 602 may additionally include a vehicle tracking graphic indication 608 that represents a real-time location of the vehicle 102 upon the scalable map 606. The vehicle tracking graphic indication 608 is shown in a triangular shape in FIG. 6. However, it is to be contemplated that the vehicle tracking graphic indication 608 may be presented in various types of shapes and/or formats upon the scalable map 606 of the map user interface 602. The user interface management module 124 may present the vehicle tracking graphic indication 608 and the scalable map 606 based on data provided by the navigation system 142. More specifically, upon presenting the map user interface 602 in the vehicle tracking mode, the GPS 144 of the navigation system 142 may provide one or more data signals that indicate the real-time location of the vehicle 102 and map data pertaining to a surround environment of the vehicle 102 that are rendered as the scalable map 606.

In some embodiments, the tracking interface 604 of the map user interface 602 may additionally include a drop-down menu user interface object 610 that may be inputted by the user 134 (via a respective touch input on the surface 136 of the touchpad 108) to view a drop-down menu (not shown) that includes one or more navigation system related functions. As an illustrative example, the drop-down menu may include functions that include, but are not limited to, a destination address input, a destination location input, a POI lookup, a view map input, a settings input, an internet services input, and the like. The tracking interface 604 may additionally include one or more textual descriptions 612 of one or more streets, addresses, and/or locations that are located within a predetermined vicinity of the vehicle 102. In particular, the textual description(s) 612 may be presented by the user interface management module 124 based on mapping data provided by the map database 146 of the navigation system 142 that may pertain to the surrounding environment of the vehicle 102.

Referring again to the method 400 of FIG. 4, upon determining gestures on the touchpad 108 located within the vehicle 102 (at block 402), the method 400 may proceed to block 404, wherein the method 400 may include changing the map user interface 602 from the vehicle tracking mode to an exploration mode. FIG. 7 illustrates an exemplary method 700 for presenting the map user interface in the exploration mode from the operating environment of FIG. 1 according to an exemplary embodiment.

The method 700 may begin at block 702, wherein the method 700 may include determining if at least one touch input is received on the touchpad 108 at an area corresponding to the scalable map 606 of the tracking interface 604. With continued reference to FIGS. 1 and 6, as the vehicle HMI 302 is presented in the vehicle tracking mode, the user interface management module 124 may send respective data signal(s) to the coordinate touch recognition module 126. The coordinate touch recognition module 126 may interpret the data signal(s) and may provide active touchpad coordinate areas and touch input zones that may be utilized to provide inputs at one or more areas of the tracking interface 604 of the map user interface 602.

Upon providing the active touchpad coordinate areas and the touch input zones, the coordinate touch recognition module 126 may determine when the user 134 provides at least one touch input at one of the active touchpad coordinate areas or the touch input zones on the surface 136 of the touchpad 108 that are mapped to the area of the tracking interface 604 that includes the scalable map 606. For example, the user 134 may provide one or more types of touch inputs that may include one or more user's fingers inputting the surface 136 of the touchpad 108 at area that may be mapped to the scalable map 606 of the tracking interface 604. The one or more types of inputs may include, but may not be limited to, a tapping input, the swiping input, the scrolling input, a sliding input, a dragging input, and the like.

If it is determined that at least one touch input is received on the touchpad 108 (at block 702), the method 700 may proceed to block 704, wherein the method 700 may include mapping the touch input to the area corresponding to the scalable map 606 on the tracking interface 604. Upon receiving at least one touch input at one of the active touchpad coordinate areas or the touch input zones, the coordinate touch recognition module 126 may send data signal(s) to the user interface management module 124 to indicate the at least one touch input received at the scalable map 606 presented on the tracking interface 604 of the map user interface 602. The user interface management module 124 may map the at least one touch input at least one area of the scalable map 606.

The method 700 may proceed to block 706, wherein the method 700 may include presenting the map user interface 602 in an exploration mode. In one embodiment, upon receiving the data signal(s) from the coordinate touch recognition module 126 indicative of the at least one touch input received on the surface 136 of the touchpad 108 that corresponds to the scalable map 606, the user interface management module 124 may interpret the data signal(s) and may determine that the at least one touch input was provided on the corresponding active touchpad coordinate area(s) or the touch input zone(s). The user interface management module 124 may change the mode of the map user interface from the vehicle tracking mode (shown in FIG. 6 above) to the exploration mode.

Figure 8A:
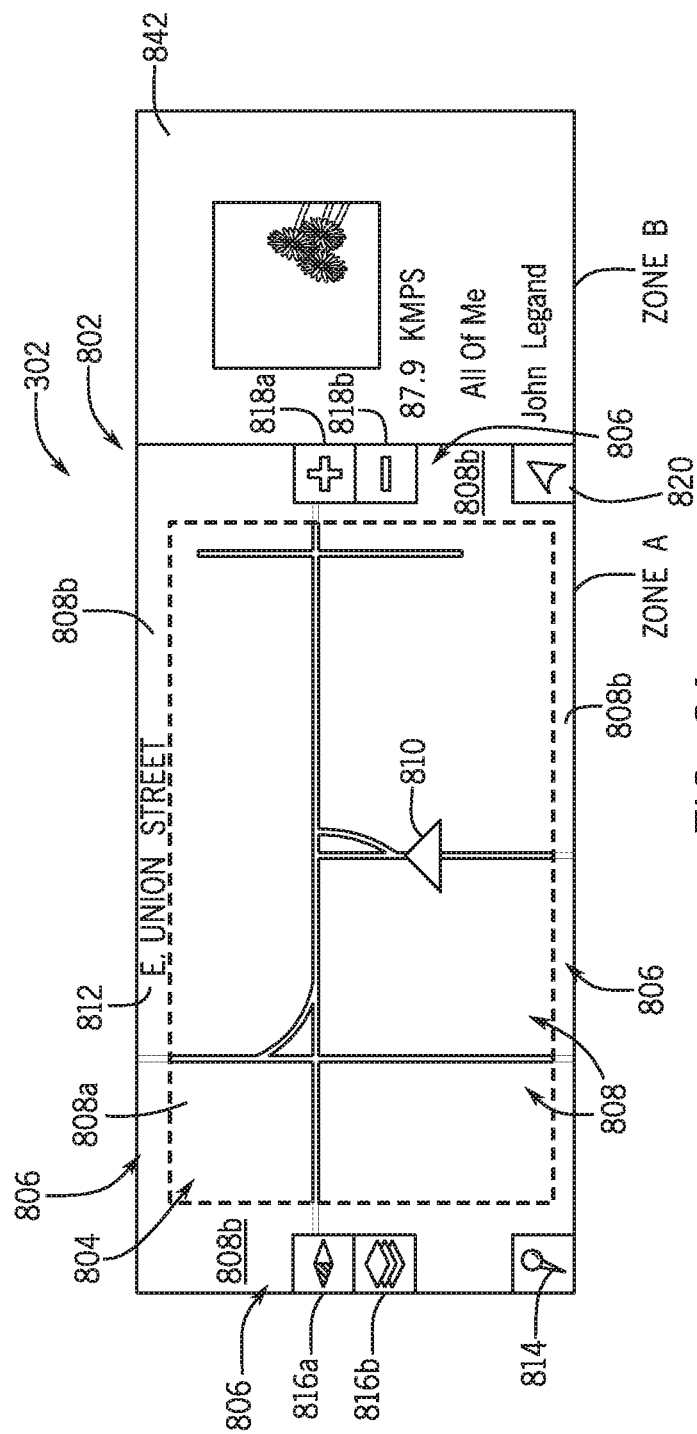
FIG. 8A is an exemplary illustration of the map user interface that is presented as part of the vehicle HMI in the exploration mode according to an exemplary embodiment.

FIG. 8A is an exemplary illustration of the map user interface 802 that is presented as part of the vehicle HMI 302 in the exploration mode according to an exemplary embodiment. It is to be appreciated that the map user interface 802 illustrated in FIGS. 8A-8D discussed below include an exemplary embodiment and that the map user interface 802 may be presented in a variety of formats that include various colors, opacity, line formats, object sizes object shapes, frame rates, stroke styles, backgrounds, background animations, object selection animations, and the like. In an exemplary embodiment, the exploration mode may include the interactive map area 804 and the inactive map area 806 of the map user interface 802. In other words, the exploration mode may be initialized by the user interface management module 124 and the interactive map area 804 and the inactive map area 806 may be presented via the display screen 110.

As shown, in one embodiment, within the exploration mode, the map user interface 802 may be presented within Zone A of the vehicle HMI 302 while another vehicle system, application, or function user interface is presented in Zone B of the vehicle HMI 302. For example, as shown within the exemplary illustration of FIG. 8, Zone A of the vehicle HMI 302 may include the map user interface 802, while Zone B includes an audio system user interface 842. In alternate embodiments, the map user interface 802 may be presented within Zone B of the vehicle HMI 302 while the other vehicle system, application, or function user interface is presented within Zone A of the vehicle HMI 302 (in place of the audio system user interface 842 shown in FIG. 8A).

In some embodiments, the map user interface 802 may include an extend user interface icon (not shown) that may be utilized to extend the map user interface 602 across both Zones A and B of the vehicle HMI 302. Consequently, upon the input of the extend user interface icon, the map user interface 802 may be presented across the vehicle HMI 302 such that it is presented across the entire display screen 110. In yet an additional embodiment, within the exploration mode the map user interface 802 may include the sub-map user interface (not shown) that may be presented within Zone B of the vehicle HMI 302 that may present details provided by the navigation system 142.

In an exemplary embodiment, the interactive map area 804 may be presented with a first portion 808*a* of the scalable map 808 that allows the user 134 to manipulate the scalable map 808. As discussed below, the interactive map area 804 may allow the user 134 to manipulate the scalable map 808 by panning the scalable map 808, selecting areas of the scalable map 808, inputting objects upon on the scalable map 808, and adding interface objects at one or more area on the scalable map 808. The scalable map 808 may be scaled in a similar manner to the scalable map 606 presented as part of the tracking interface 604, as discussed above. For example, the user 134 may provide touch inputs (e.g., touch input gestures) at one or more areas of the scalable map 808 to change a scale of the scalable map 808 to a different aspect, view, and/or detail with respect to the tracking of the vehicle 102. The scalable map 808 may be controlled by the user 134 based on one or more touch input gestures to be scaled to represent different layers, distances, and/or environments. For instance, the scalable map 808 may be viewed in a zoomed-in or zoomed-out format based the receipt of one or more pinching in or pinching out gestures on the touchpad 108, as interpreted by the coordinate touch recognition module 126 and communicated to the user interface management module 124.

Upon initialization of the exploration mode of the map user interface 802, the interactive map area 804 may initially be presented with a vehicle tracking graphic indication 810 that represents the real-time location of the vehicle 102 presented on the scalable map 808. The vehicle tracking graphic indication 810 is shown in a triangular shape in FIG. 8A. However, it is to be contemplated that the vehicle tracking graphic indication 810 may be presented in various types of shapes and/or formats upon the scalable map 808 of the map user interface 802. When initially presented in the exploration mode, the map user interface 802 may present the interactive map area 804 as including the vehicle tracking graphic indication 810 that represents the real-time location of the vehicle 102 upon the scalable map 808. In particular, the user interface management module 124 may present the vehicle tracking graphic indication 810 and the scalable map 808 based on data provided by the navigation system 142. More specifically, upon presenting the map user interface 802 in the vehicle tracking mode, the GPS 144 of the navigation system 142 may provide one or more data signals that indicate the real-time location of the vehicle 102 and map data pertaining to the surrounding environment of the vehicle 102.

In one embodiment, the inactive map area 806 may be presented within the same zone as the interactive map area 804. The inactive map area 806 may be presented as bordering the interactive map area 804 at one or more sides of the interactive map area 804. For example, as shown in FIG. 8A, the inactive map area 806 may be included within Zone A of the vehicle HMI 302 as bordering the interactive map area 804 of the map user interface 802.

The inactive map area 806 may include one or more user interface graphics that are associated with features, selections, and/or inputs that are presented or provided with respect to the interactive map area 804. In one embodiment, the inactive map area 806 may include one or more textual descriptions 812 that may be modified based on inputs provided by the user 134 with respect to the interactive map area 804. For example, as shown in FIG. 8A, upon the initialization of the exploration mode, the one or more textual descriptions 812 may be presented as a street name of the street on which the vehicle 102 is traveling. However, as discussed below, the textual descriptions 812 may be modified to describe additional details when the user 134 provides respective inputs to the interactive map area 804 of the map user interface 802.

The inactive map area 806 may additionally include a drop pin input 814. As explained in more detail below, the user 134 may provide a touch input on the touchpad 108 to input the drop pin input 814 to provide further touch input(s) to input one or more pins upon the scalable map 808 presented within the interactive map area 804. The inactive map area 806 may also include a map layering input 816*a* that may be inputted by the user 134 to present one or more map layers (e.g., street view, above view, etc.) as part of the map layering function. Additionally, the inactive map area 806 may include a map orientation input 816*b* that may be inputted by the user to present one or more orientations (two-dimensional, three-dimensional, etc.) of the scalable map 808 presented within the interactive map area 804, as part of the map orientation function.

In one embodiment, the inactive map area 806 may include scaling inputs 818*a*, 818*b* that may be inputted to scale the scalable map 808 presented within the interactive map area 804 and partially within the inactive map area 806 (as discussed below). For example, the scalable map 808 may be viewed in a zoomed-in or zoomed-out format based the input of the respective scaling inputs 818*a*, 818*b* presented within the inactive map area 806. In some embodiments, during a scenario in which the user 134 has panned to another portion of the scalable map 808, the inactive map area 806 may also include a current position input 820 that may be inputted to return the scalable map 808 to present the real-time view of the vehicle 102 that includes the vehicle tracking graphic indication 810 that represents the real-time location of the vehicle 102 upon the scalable map 808.

In an exemplary embodiment, upon presenting the map user interface 802 within the exploration mode, the user interface management module 124 may communicate one or more data signals to the coordinate touch recognition module 126. The one or more data signals may be indicative of the presentation of map user interface 802 and the user interface objects that are presented within the interactive map area 804 and the inactive map area 806 of the map user interface 802. Upon receiving the data signal(s), the coordinate touch recognition module 126 may determine active touch coordinate areas and touch input zones that may be applicable to touchpad coordinates on the surface 136 of the touchpad 108. Therefore, the user 134 may provide touch inputs to the active touch coordinate areas and the touch input zones to provide touch inputs to the user interface objects presented on the map user interface 802.

As shown, the first portion 808*a* of the scalable map 808 is presented within the interactive map area 804 and a second portion 808*b* of the scalable map 808 is presented within the inactive map area 806. The first portion 808*a* of the scalable map 808 presented within the interactive map area 804 may be included as a foreground graphic of the scalable map 808 of the surrounding environment of the vehicle 102. Additionally, the second portion 808*b* may be included as a background graphic of the scalable map 808 of the surrounding environment of the vehicle 102. In particular, the second portion 808*b* may include one or more portions of the scalable map 808 that fall a predetermined distance outside the first portion 808a that is the included as the foreground graphic of the scalable map within the interactive map area 804. In other words, the scalable map 808 may include one or more additional portions that are not included within the foreground graphic that may be partially presented within the inactive map area 806 of the map user interface 802 within the exploration mode.

As discussed in more detail below, the user 134 may utilize one or more touch input gestures to pan the scalable map 808 to change the first portion 808a of the scalable map 808 presented within the interactive map area 804 and the second portion 808b presented within the inactive map area 806 of the map user interface 802. Therefore, the interactive map area 804 and the inactive map area 806 may both present a plurality of portions of the scalable map 808 that may be modified after the initialization of the exploration mode of the map user interface 802.

In an exemplary embodiment, the second portion 808b of the scalable map 808 presented within the inactive map area 806 may receive one or more gestures that are different than the gestures utilized to manipulate the first portion 808a of the scalable map 808. For instance, one or more click input type gestures may be completed to provide inputs to the objects presented (upon the second portion 808b of the scalable map 808) on the inactive map area 806 that may differ from dragging gestures and/or swiping gestures that are inputted upon the first portion 808a of the scalable map 808. In particular, the one or more click input gestures may be utilized as an alternate type of gesture that is used to provide inputs upon the inactive map area 806 that may differ from one or more types of gestures that may be provided to pan the scalable map 808 in the interactive map area 804. In one or more embodiments, the inactive map area 806 may only receive inputs based on one or more gestures that differ from the one or more types of gestures that may be provided to pan and/or input the scalable map. More particularly, the user 134 may utilize a dragging touch input gesture to pan the scalable map 808 within the interactive map area 804 at a first speed and a swiping touch input gesture to pan the scalable map 808 within the interactive map area 804 at a second speed. However, the dragging touch input gesture and/or the swiping touch input gesture may not be utilized by the user 134 to provide inputs to the inactive map area 806. Instead, the user 134 may provide click input gestures to provide inputs on the second portion 808b of the scalable map 808 presented within the inactive map area 806.

Figure 9A:
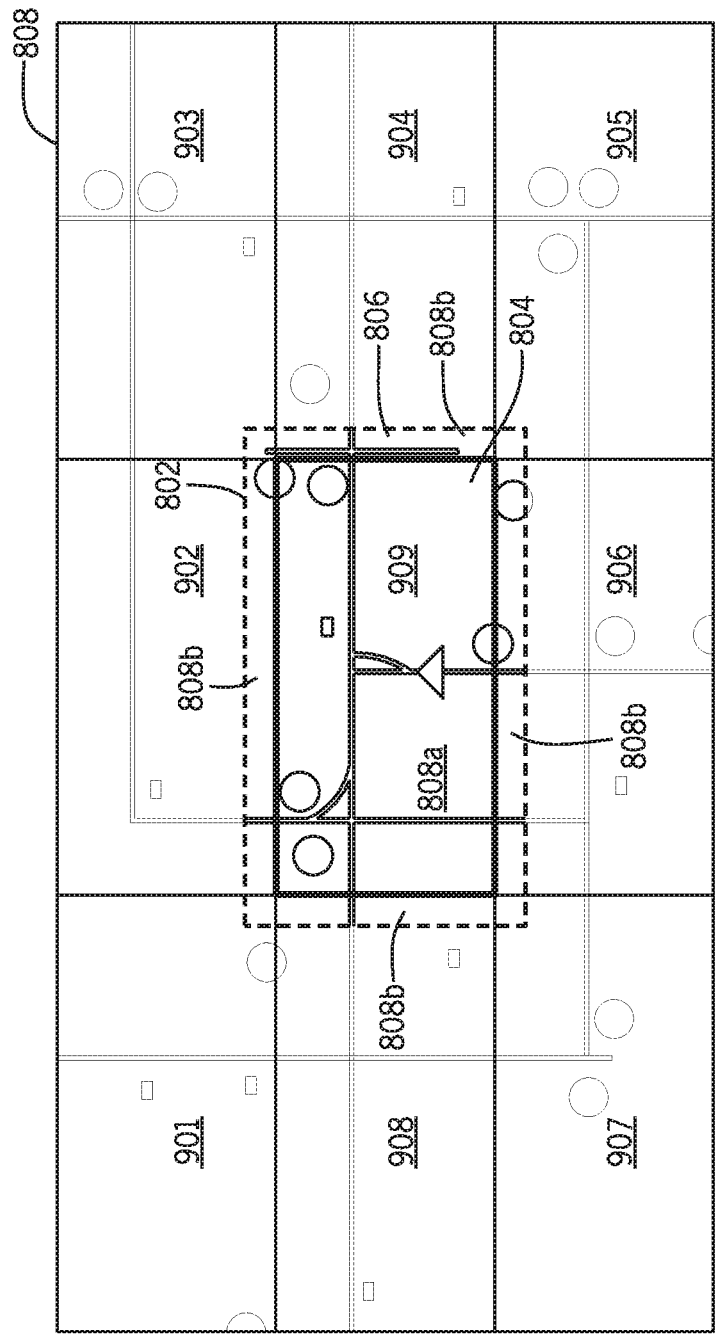
FIG. 9A is an illustrative embodiment that includes a view of a plurality of pages of the scalable map according to an exemplary embodiment.

FIG. 9A includes an illustrative embodiment that includes a portioned view of a plurality of pages 901-909 of the scalable map 808 according to an exemplary embodiment. It is to be appreciated that the plurality of pages may include a few or greater number of pages than area illustrated in FIG. 9A. Additionally, the plurality of pages 901-909 may be configured in various sizes and may be include a varying amount of data that may be based on scaling of the scalable map 808. As discussed, the first portion 808a of the scalable map 808 may be presented within the interactive map area 804 and the second portion 808b of the scalable map 808 may be presented within the inactive map area 806. As shown in FIG. 9A, upon initialization of the exploration mode of the map user interface 802, the first portion 808a of the scalable map 808 may include an entirety of a page 909 that may be presented within the interactive map area 804. Therefore, additional pages 901-908 of the scalable map 808 may not be presented within the interactive map area 804 as the foreground graphic of the scalable map 808.

As described below, the additional pages 901-908 may be presented within the interactive map area 804 based on touch input gestures provided by the user 134 that are utilized to pan the scalable map 808. As illustrated, the second portion 808b of the scalable map 808 may include partial portions of the pages 902, 904, 906, 908 that are surrounding the map portion 909 and may be presented within the inactive map area 806. As represented in FIGS. 8A and 9A, the inactive map area 806 may include the pages 902, 904, 906, 908 of the scalable map 808 that fall a predetermined distance outside the first portion 808a that includes the page 909 and that is the presented as the foreground graphic of the scalable map 808 within the interactive map area 804. Therefore, as described in more detail below, as the user 134 provides touch input gestures to pan the scalable map 808, the inactive map area 806 may include additional/alternate pages of the plurality of pages 901-909 of the scalable map 808 based on at least one page of the plurality of pages 901-909 that is presented as the first portion 808a within the interactive map area 804 of the map user interface 802.

Referring again to method 700 of FIG. 7, upon presenting the map user interface 802 in the exploration mode (at block 706), the method 700 may proceed to block 708, wherein the method 700 may include presenting user interface objects on the scalable map 808. In one embodiment, within the exploration mode, the map user interface 802 may present one or more user interface objects that may be presented on the scalable map 808 of the map user interface 802. The one or more user interface objects may include, but may not me limited to, POI user interface objects, exit icon user interface objects, saved location user interface objects, etc.

More specifically, upon presenting the scalable map 808, the user interface management module 124 may communicate with the navigation system 142 to receive one or more data signals that include POI data, road exit data, location data, and the like. With respect to the saved location user interface objects, the user 134 may store one or more saved locations (e.g., home address, work address, etc.) that may be stored within the map database 146 and may be communicated to the user interface management module 124 to be presented accordingly based on the location of the vehicle 102 as determined by the GPS 144. The POI data, road exit data, and location data may include information related to one or more POIs, road exits, and physical locations (e.g., home addresses) that are included within the surrounding environment of the vehicle 102 which is presented within the first portion 808a of the scalable map 808 within the interactive map area 804. Additionally, the POI data, road exit data, and location data may include information of one or more POIs, road exits, and physical locations that are included within the surrounding environment of the vehicle 102 which is presented within the second portion 808b of the scalable map 808 within the inactive map area 806 of the map user interface 802. Upon receiving the respective data from the map database 146 of the navigation system 142, the user interface management module 124 may present the one or more POI user interface objects, exit icon user interface objects, and saved location user interface objects upon the scalable map 808 presented within the interactive map area 804 and the inactive map area 806.

Figure 8B:
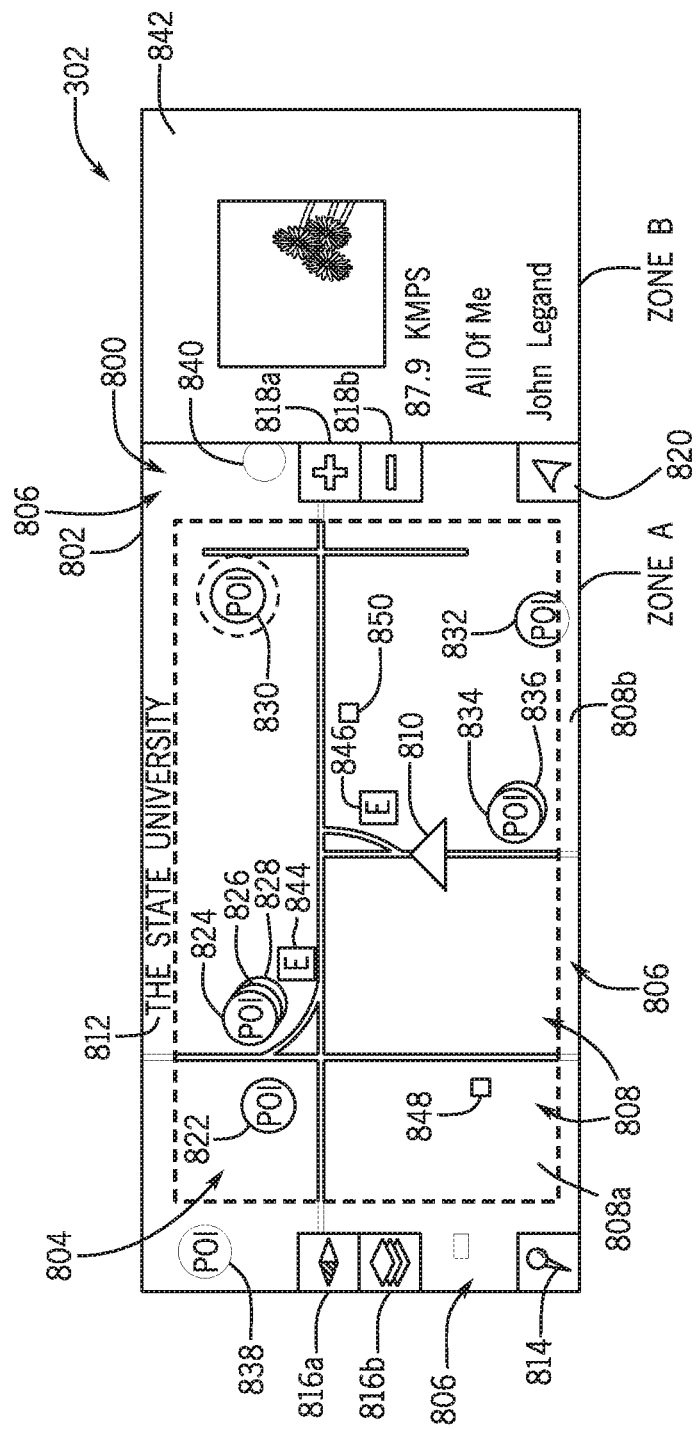
FIG. 8B is an exemplary illustration of the map user interface that includes user interface objects that are presented upon a scalable map within the exploration mode according to an exemplary embodiment.

FIG. 8B is an exemplary illustration of the map user interface 802 includes user interface objects that are presented upon the scalable map 808 within the exploration mode according to an exemplary embodiment. As shown, the first portion 808a of the scalable map 808 presented within the interactive map area 804 includes a plurality of POI user interface objects 822-840, a plurality of exit icon user interface objects 844, 846, and a plurality of saved location user interface objects 848, 850. Additionally, the second portion 808b of the scalable map 808 presented within the inactive map area 806 includes a plurality of POI user interface objects 838, 840.

In one embodiment, each of the POI user interface objects 822-840 may be presented independently when one or more of the POIs (represented by the POI user interface objects 822-840) are not located within a predetermined close proximity of another one or more of the POIs. In particular, upon analyzing the POI data provided by the map database 146 of the navigation system 142, the user interface management module 124 may present one or more of the POIs that are not located within the predetermined close proximity of another one or more of the POIs as stand-alone POI user interface objects within one or more predetermined scales (e.g., zoom levels) of the scalable map 808. For example, as shown in FIG. 8B, the user interface management module 124 presents the POI user interface objects 822, 830, 832, 838, 840 as stand-alone objects since there are no other POIs that are located within a predetermined close proximity of them.

In an exemplary embodiment, two or more of the POI user interface objects 822-840 may be presented as clustered objects when two or more of the POIs (represented by the POI user interface objects 822-840) are located within a predetermined close proximity of one another within one or more predetermined scales (e.g., zoom levels) of the scalable map 808. In particular, upon analyzing the POI data provided by the map database 146 of the navigation system 142, the user interface management module 124 may present two or more of the POIs that are located within the predetermined close proximity of one another as POIs that are rendered as clustered objects. For example, as shown in FIG. 8B, the user interface management module 124 presents the POI user interface objects 824, 826, 828 as clustered objects. In some embodiments, the map database 146 may provide additional data to the user interface management module 124 indicating an order of the POIs that are to be clustered based on or more navigation system settings that may be inputted by the user 134. It is to be appreciated that as the user 134 provides touch input gestures or inputs the scaling inputs 818a, 818b to scale the scalable map 808, the plurality of POI user interface objects 822-840 may be presented from stand-alone to clustered or clustered to stand-alone as the user changes the scale at which the scalable map 808 is presented (e.g., by zooming-in or zooming-out the scalable map 808).

In some embodiments, one or more of the POI user interface objects, exit icon user interface objects, and saved location user interface objects may be presented within both the interactive map area 804 and the inactive map area 806. For example, as shown in FIG. 8B, the POI user interface object 832 is presented within both the interactive map area 804 and the inactive map area 806. The user 134 may provide touch inputs to the POI user interface objects, exit icon user interface objects, and saved location user interface objects that are presented within both the interactive map area 804 and the inactive map area 806 when the user interface management module 124 determines that a center portion of the user interface object(s) is presented within the interactive map area 804. As an illustrative example, if the user interface management module 124 determines that a center portion of the POI user interface object 832 is within the interactive map area 804, the user 134 may provide an input on the POI user interface object 832 even though it is partially presented within the inactive map area 806.

Referring again to the method 700 of FIG. 7, upon presenting the user interface objects on the scalable map 808 (at block 708), the method 700 may proceed to block 710, wherein the method 700 may include determining if at least one input is received on at least one user interface object presented within the interactive map area 804. In one embodiment, the user interface management module 124 may only allow the user 134 to input the POI user interface objects, exit icon user interface objects, and saved location user interface objects that are presented within the interactive map area 804. Additionally, as discussed, the user interface management module 124 may allow the user 134 to input the POI user interface objects, exit icon user interface objects, and saved location user interface objects that are presented within the interactive map area 804 and the inactive map area 806 that include center portions that are included within the interactive map area 804.

Upon presenting the user interface objects on the scalable map 808 of the map user interface 802 the user interface management module 124 may communicate one or more data signals to the coordinate touch recognition module 126. The one or more data signals communicated to the coordinate touch recognition module 126 may be indicative of the presentation of map user interface 802 and the user interface objects that are presented within the interactive map area 804 or that include center portions that are included within the interactive map area 804. Upon receiving the data signal(s), the coordinate touch recognition module 126 may determine active touch coordinate areas and touch input zones that may be applicable to touchpad coordinates on the surface 136 of the touchpad 108. Consequently, the user 134 may provide touch inputs to the active touch coordinate areas and the touch input zones on the surface 136 of the touchpad 108 to provide inputs to the user interface objects presented within the interactive map area 804 or that include center portions that are included within the interactive map area 804 of the map user interface 802.

In one embodiment, if the user 134 provides a touch input on the surface 136 of the touchpad 108 at the active touch coordinate areas or the touch input zones, the coordinate touch recognition module 126 may communicate the touch input coordinates and the touchpoint data of the user's touch input to the user interface management module 124. The user interface management module 124 may interpret the touch input coordinates and the touchpoint data and may determine that the user 134 has provided at least one input to at least one user interface object presented within the interactive map area 804 or to at least one portion of the first portion 808a of the scalable map 808.

If it is determined that at least one input is received on at least one user interface object presented within the interactive map area (at block 710), the method 700 may proceed to block 712, wherein the method 700 may include presenting user interface object graphics on the map user interface 802. As discussed above, the coordinate touch recognition module 126 may communicate the touch input coordinates and touchpoint data of the user's touch input to the user interface management module 124. The user interface management module 124 may analyze the touch input coordinate and touchpoint data and may present one or more types of user interface object graphics. As discussed below, the user interface object graphics may include one or more details pertaining to POIs, exits, and/or locations based on the input of one or more respective POI user interface objects, exit icon user interface objects, and saved location user interface objects that are presented within the interactive map area 804 of the map user interface 802.

In one embodiment, the user interface management module 124 may interpret the data provided by the coordinate touch recognition module 126 and may determine a specific type of touch input corresponding to at least one POI user interface object. In one embodiment, if user interface management module 124 determines that touch input is a hovering touch input (e.g., indicated based on a sliding and holding of the user's finger at the mapped area of the touchpad 108), the user interface management module 124 may present the respective POI user interface object(s) that is selected (e.g., inputted) based on the hovering input as an enlarged POI user interface object(s). In other words, as the user 134 provides the hovering input over the user interface object(s), the user interface management module 124 may present the respective POI user interface object(s) in a larger format than originally presented within the interactive map area 804 of the map user interface 802. The user interface management module 124 may additionally present one or more textual descriptions 812 with a general description of the POI corresponding to the POI user interface object, as selected. For example, with reference to FIG. 8B, if the user 134 touch inputs the surface 136 of the touchpad 108 corresponding to the POI user interface object 830, the textual description(s) 812 presented within the inactive map area 806 may include the name of the POI corresponding to the POI user interface object 830 as selected.

In one or more embodiments, if the user interface management module 124 interprets the data provided by the coordinate touch recognition module 126 and determines that the type of input is a selection touch input (e.g., tapping input, pressing input) of the at least one POI user interface object within the interactive map area 804, the user interface management module 124 may present a detailed description of the corresponding POI(s) presented on the detailed interface card. In other words, when the user provides a touch input at mapped position of the touchpad 108 to select the at least one POI user interface object, the detailed description of the corresponding POI may be presented on the detailed interface card. As discussed below, the detailed interface card may present the user 134 with specific details that pertain to the corresponding POI on the map user interface 802. In some embodiments, the detailed interface card may present the user 134 with specific details that pertain to additional locations that are presented on the scalable map 808 including, but not limited to saved locations and exits.

In an exemplary embodiment, upon determining the hovering touch input or the touch input upon the at least one user interface object presented within the interactive map area 804, the user interface management module 124 may interpret the location and type of touch input(s) based on touch coordinates and touch input data received from the coordinate touch recognition module 126. The user interface management module 124 may send one or more data signals to the map database 146 to determine data that pertains to the POI corresponding to the user interface object inputted by the user 134. More particularly, when the hovering touch input is received by the user 134 upon the at least one POI user interface object, the user interface management module 124 may receive one or more respective data signals pertaining to data associated with the POI from the map database 146 and may present the map user interface 802 as including the enlarged POI user interface object, and associated textual description 812.

Alternatively, when the selection touch input is received by the user 134 upon the at least one POI user interface object, the user interface management module 124 may receive one or more respective data signals pertaining to data associated with the at least one POI from the map database 146 and may present the detailed interface card that may be presented with specific details pertaining to the corresponding POI(s). As an illustrative example, the user 134 may utilize the touchpad 108 to provide a touch input over the POI user interface object 830 that is presented on the scalable map 808 within the interactive map area 804 of the map user interface 802. The user interface management module 124 may receive one or more respective data signals pertaining to data associated with the POI user interface object 830 from the map database 146 and may present the map user interface 802 as including the detailed interface card with detailed information pertaining to the POI associated with the POI user interface object 830.

Figure 8C:
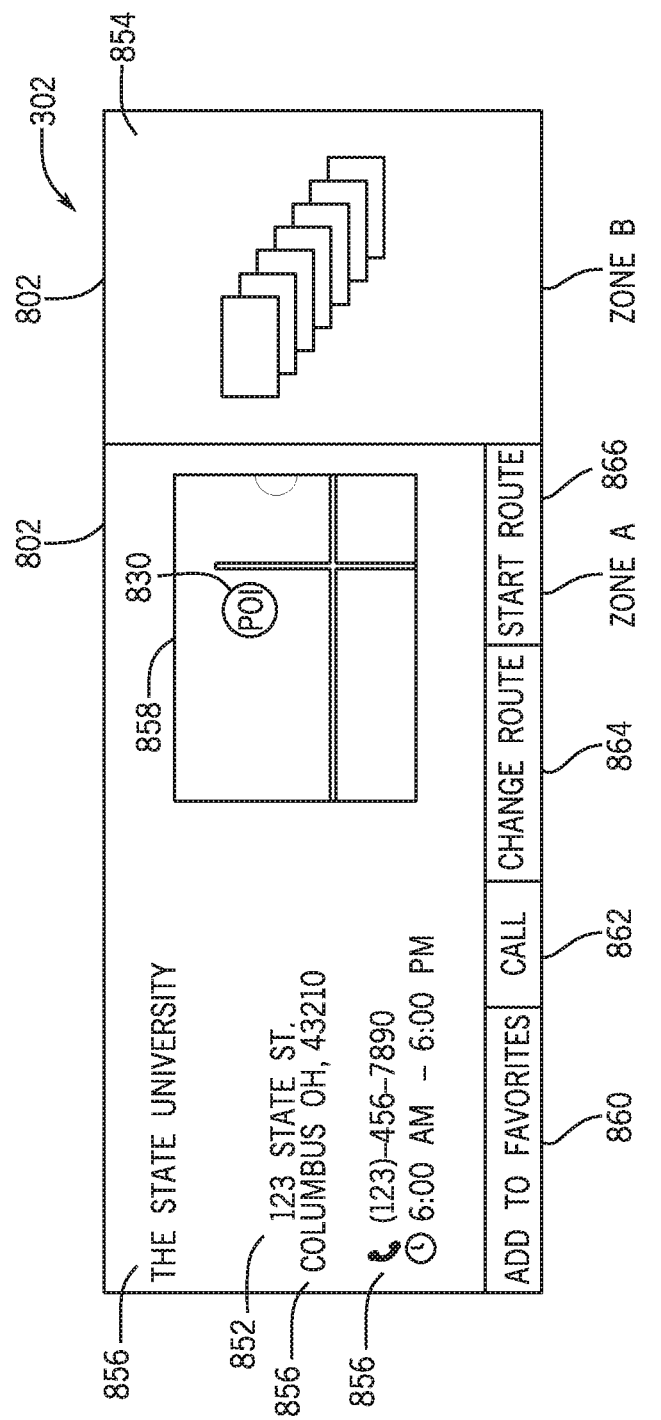
FIG. 8C is an exemplary illustration of the map user interface that includes a detailed interface card within the exploration mode according to an exemplary embodiment.

FIG. 8C is an exemplary illustration of the map user interface 802 that includes the detailed interface card 852 within the exploration mode according to an exemplary embodiment. As shown, in one embodiment, upon determining the hovering touch input, the user interface management module 124 may present the vehicle HMI 302 as an extended presentation of the map user interface 802 that is presented within Zones A and B of the vehicle HMI 302. As shown, the detailed interface card 852 may be presented within Zone A, while an interface 854 that includes a list of additional selectable detailed interface cards is presented within Zone B. In alternate embodiments, the detailed interface card 852 may be presented within Zone B, while the interactive map area 804 and the inactive map area 806 continue to be presented within Zone A. In additional embodiments, the detailed interface card 852 may be presented within Zone A, while the scalable map 808 presenting the real-time location of the vehicle 102 may be presented within Zone B. It is to be appreciated that various formats of the map user interface 802 and various additional vehicle system user interfaces may be presented within Zone A or Zone B as the user interface management module 124 presents the detailed interface card 852.

In an exemplary embodiment, the detailed interface card 852 may include detailed textual information 856 that may be presented via the map user interface 802. As represented within the illustrative example of FIG. 8C, the detailed textual information 856 may include descriptive information pertaining to a POI corresponding to the POI user interface object 830, as selected, shown in FIG. 8B. The detailed interface card 852 may additionally include a view 858 of the scalable map 808 that presents a scaled (e.g., zoomed-in) view of the POI user interface object 830 upon the scalable map 808. For example, as shown in FIG. 8C, the view 858 of the scalable map 808 presents the scaled view of the POI user interface object 830. In some embodiments, the user 134 may be able to scale, pan, or modify the view 858 of the scalable map 808 presented as part of the detailed interface card 852 to present a modified view of the scalable map 808.

In some embodiments, the user interface management module 124 may additionally present one or more navigation system function objects that may be inputted by the user 134 to provide additional functions pertaining to the POI(s) that is detailed by the detailed interface card 852. For example, as shown in FIG. 8C, the detailed interface card 852 may include the navigation system function objects 860-866 that may be inputted in order for the navigation system 142 to perform corresponding functions. In some embodiments, input(s) provided on one or more of the navigation system function objects 860-866 may enable the user interface management module 124 to present the interactive map area 804 and the inactive map area 806 in place of the detailed interface card 852. For example, if the user 134 inputs the start route navigation system function object 866, the user interface management module 124 may present turn by turn directions to the POI on the scalable map 808 within the interactive map area 804 of the map user interface 802.

Referring again to FIG. 8B, in one embodiment, the user interface management module 124 may interpret the data provided by the coordinate touch recognition module 126 and may determine a selection touch input is provided on one or more of the exit icon user interface objects 844, 846 presented within the interactive map area 804 of the map user interface 802. In one embodiment, upon determining the selection touch input of one or more of the exit icon user interface objects 844, 846, the user interface management module 124 may present one or more POI user interface object(s) associated with POIs that are located within a predetermined vicinity of the respective exit(s) based on data provided by the map database 146 of the navigation system 142. For example, if the user 134 touch inputs the surface 136 of the touchpad 108 corresponding to the exit icon user interface object 844, one or more POI user interface object(s) (now shown) may presented upon the scalable map 808 representing one or more POIs located within a predetermined vicinity of the exit represented by the exit icon user interface object 844.

In some embodiments, the user interface management module 124 may interpret the data provided by the coordinate touch recognition module 126 and may determine if a selection touch input is provided on one or more of the saved location user interface objects 848, 850 presented within the interactive map area 804 of the map user interface 802. In one embodiment, upon determining the selection touch input of one or more of the saved location user interface objects 848, 850, the user interface management module 124 may determine details regarding the saved location(s) as provided by the map database 146 of the navigation system 142. The user interface management module 124 may present a general description near the selected object(s) upon the scalable map 808 (not shown) (e.g., name, address, details) associated with the saved location user interface object(s) 848, 850 as selected. In some embodiments, the user interface management module 124 may present one or more details associated with the saved location (as selected) as one of the one or more textual descriptions 812 presented within the inactive map area 806 of the map user interface 802. For example, the one or more textual descriptions 812 may be presented as an address of the saved location (as selected) that is presented on within the inactive map area 806. In additional embodiments, the detailed interface card may be presented with data that is associated with the saved location(s) corresponding to the selected saved location user interface object(s).

Referring again to the method 700 of FIG. 7, if at least one input is not received on the at least one user interface object (at block 710), or upon presenting the user interface object graphics on the map user interface (at block 712), the method 700 may proceed to block 714, wherein the method 700 may include determining if an input is received on the drop pin input 814 on the inactive map area 806 of the map user interface 802. As discussed above, within the exploration mode, as shown in FIGS. 8A and 8B, the inactive map area 806 may be presented the drop pin input 814. The user 134 may provide a touch input(s) on a respective area(s) of the surface 136 of the touchpad 108 to input the drop pin input 814 to input one or more pins as place markers upon the scalable map 808 presented within the interactive map area 804. In one embodiment, upon the touch input of the respective area of the surface 136 of the touchpad 108, the coordinate touch recognition module 126 may send one or more respective data signals to the user interface management module 124 indicting the touch input(s). Upon analyzing the data signal(s), the user interface management module 124 may determine that user input is received on the drop pin input 814 within the inactive map area 806 of the map user interface 802 based on absolute or zone coordinate mapping.

Figure 8D:
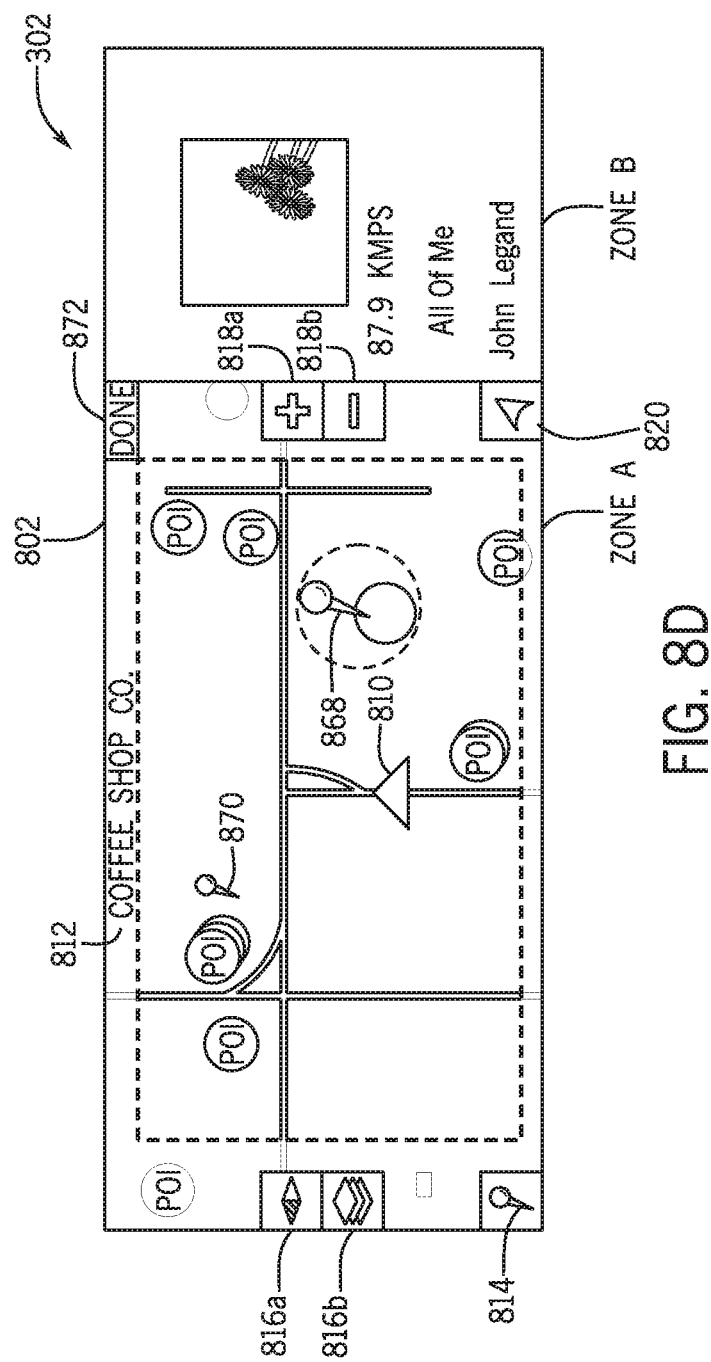
FIG. 8D is an exemplary illustration of the map user interface that includes pin user interface objects that are presented upon the scalable map within the exploration mode according to an exemplary embodiment.

If it is determined that the user input is received on the drop pin input 814 within the inactive map area 806 of the map user interface 802 (at block 712), the method 700 may proceed to block 714, wherein the method 700 may include presenting at least one pin user interface object on the scalable map 808 and presenting at least one user interface graphic based on at least one user input received within the interactive map area 804 of the map user interface 802. FIG. 8D is an exemplary illustration of the map user interface 802 that includes pin user interface objects 868, 870 that are presented on the scalable map 808 within the exploration mode according to an exemplary embodiment. In one embodiment, upon inputting the drop pin input 814 within the inactive map area 806 of the map user interface 802, the user 134 may utilize the touchpad 108 to touch input one or more portions of the scalable map 808 presented within the interactive map area 804 to input one or more pin user interface objects 868, 870 on the scalable map 808. The pin user interface object(s) 868, 870 may be utilized as place marker(s) that are presented on the scalable map 808 and are representative of POIs, address, locations, and the like that the user 134 would like to temporarily assign as saved locations.

Upon placing touch input(s) at respective areas of the surface 136 of the touchpad 108, the coordinate touch recognition module 126 may send one or more respective data signals to the user interface management module 124. Since the user interface management module 124 has determined that the user input has been received on the drop pin input 814 (as discussed above with respect to block 712), the user interface management module 124 may present the pin user interface object(s) 868, 870 that represent the touch input(s) provided by the user 134.

In one embodiment, upon receiving the touch input(s), the user interface management module 124 may interpret the location of the touch input(s) using absolute and zone coordinate mapping and may send one or more data signals to the map database 146 to determine data that pertains to a geo-location of the area(s) of the scalable map 808 inputted by the user 134 to input one or more of the pin user interface objects 868, 870. The geo-location of the area(s) may be determined based on data provided by the GPS 144 of the navigation system 142. The user interface management module 124 may receive one or more respective data signals pertaining to data associated with the geo-location of the area(s) from the map database 146 and may present the map user interface as including the one or more pin user interface objects 868, 870 based on the touch inputs provided by the user 134. More specifically, the data associated with the geo-location of the area(s) may pertain to the street address(es), state, county, city, other locations (e.g., bodies of water), that are located within a predetermined vicinity of the area(s). In one embodiment, the navigation system 142 may utilize the geo-location of the area(s) and the associated data to provide a route to the user 134 to navigate to the street address(es), and/or other locations located within the predetermined vicinity of the area(s) of the scalable map inputted by the user 134 to input one or more of the pin user interface objects 868, 870.

In one embodiment, upon touch input to input one or more of the pins, the user interface management module 124 may present one or more descriptions (e.g., name, street address, coordinates, etc.) associated with a location(s) corresponding to the area(s) of the scalable map 808 inputted by the user 134 to input one or more of the pins. In one embodiment, the one or more descriptions may be presented as the one or more textual descriptions 812 that are included within the inactive map area 806 of the map user interface 802. For example, as shown in FIG. 8D, if the user touch inputs an area of the scalable map 808 to add the pin user interface object 868, the user interface management module 124 may present a name of a location corresponding to the area as the one or more textual descriptions 812 that are included within the inactive map area 806. In particular, the map database 146 may provide the description(s) to be presented to the user interface management module 124 based on the geolocation of the area as determined and provided by the GPS 144 of the navigation system 142.

In one or more embodiments, the user interface management module 124 may present a user interface icon 872 that may be inputted by the user 134 upon the user's input of one or more pin user interface objects 868, 870 upon the scalable map 808. In particular, the user interface icon 872 may be inputted by the user 134 to present one or more detailed interface cards that may be presented with the one or more specific descriptions associated with a location(s) corresponding to the area(s) of the scalable map 808 that include the pin user interface objects 868, 870. The detailed interface cards may be presented in similar format as the detailed interface card 852 shown in FIG. 8C, as discussed in detail above. For example, the detailed interface cards may include descriptive information pertaining to a location corresponding to the pin user interface object 868, shown in FIG. 8D. The detailed interface card(s) may additionally include a view (similar to the view 858 shown in FIG. 8C) of the scalable map 808 that presents a scaled view of the location correspond to the pin user interface object 868. Additionally, the detailed interface card(s) may include one or more navigation system function objects similar to the navigation system function objects 860-866 that may be inputted in order for the navigation system 142 to perform corresponding functions.

Referring again to the method 400, of FIG. 4, upon changing the map user interface 802 from the vehicle tracking mode to an exploration mode (at block 404), the method 400 may proceed to block 406, wherein the method 400 may include determining a first gesture on the touchpad to pan the scalable map 808 presented on the map user interface at a first speed. In one embodiment, upon presenting the map user interface 802 in the exploration mode, the user interface management module 124 may interpret the touchpoint coordinates and the touchpoint data provided by the coordinate touch recognition module 126 to determine specific types of touch inputs being inputted by the user 134 on the touchpad 108 as panning inputs. In particular, when the map user interface 802 is presented in the exploration mode, panning inputs may be utilized to pan the scalable map 808 presented on the map user interface 802 such that portions of pages of the scalable map 808 (illustrated in FIG. 9A) that are not presented on the first portion 808a within the interactive map area 804 and the second portion 808b within the inactive map area 806 may be presented by panning. In one embodiment, as discussed below, when the first gesture is utilized to pan the first portion 808a of the scalable map by a page, a portion of the current page may still be visible within the interactive map area 804 in addition to the portion of the additional page.

In one or more embodiments, the user interface management module 124 may interpret a two-fingered dragging touch input gesture as the first gesture that may be utilized to pan the scalable map 808 at the first speed. The first speed may be provided at one or more respective speeds that are slower than the second speed that is utilized to pan the scalable map 808. In an alternate embodiment, the first gesture may be provided as one or more alternate gestures types that are provided by utilizing a predetermined number of the user's fingers, that may include, but may not be limited to, swiping gestures, turning gestures, pinching gestures, etc.

More specifically, upon presentation of the map user interface 802 in the exploration mode, the user interface management module 124 may interpret touchpad coordinates and touchpoint data communicated by the coordinate touch recognition module 126 to determine the first gesture that is provided to pan the scalable map 808 at the first speed. In particular, the first gesture may be utilized to pan the first portion 808a of the scalable map 808 presented within the interactive map area 804 by a page, an area of a page, or by one or more pages (illustrated in FIG. 9A) in the first (slower) speed.

In an exemplary embodiment, based on the touchpad coordinates and touchpoint data communicated by the coordinate touch recognition module 126, the user interface management module 124 may determine a placement of two of the user's fingers on the surface 136 of the touchpad 108 while performing the dragging touch input gesture that is utilized as the first gesture. The user interface management module 124 may evaluate the touchpad coordinates of the areas on the surface 136 of the touchpad 108 that the dragging touch input gesture is provided. Additionally, the user interface management module 124 may analyze the touchpoint data pertaining to the dragging touch input gesture to determine the direction of dragging touch input gesture, the speed of dragging touch input gesture, and the like to pan the scalable map 808 at the first speed.

In one embodiment, upon interpreting the touchpad coordinates and touchpoint data of the dragging touch input gesture, the user interface management module 124 may pan the scalable map at the first speed to present additional/alternate portions of the page(s) of the scalable map 808 at the first portion 808a of the scalable map 808 within the interactive map area 804 and the second portion 808b within the inactive map area of the map user interface 802 in accordance with the dragging touch input gesture received on the surface 136 of touchpad 108.

With reference again to the method 400, of FIG. 4, the method 400 may proceed to block 408, wherein the method 400 may include determining a second gesture on the touchpad 108 to pan the scalable map 808 presented on the map user interface 802 at a second speed which is faster than the first speed. In one embodiment, upon presentation of the map user interface 802 in the exploration mode, the user interface management module 124 may interpret touchpad coordinates and touchpoint data communicated by the coordinate touch recognition module 126 to determine the second gesture that is provided to pan the scalable map 808 at the second speed. In particular, the second gesture may be utilized to pan the first portion 808a of the scalable map 808 presented within the interactive map area 804 by a page, an area of a page, or by one or more pages (illustrated in FIG.

9A) in a second speed that is faster than the first speed, discussed above. In one embodiment, as discussed below, when the second gesture is utilized to pan the first portion 808a of the scalable map by a page, a portion of the current page may still be visible within the interactive map area 804 in addition to the portion of the additional page.

In one embodiment, the user interface management module 124 may interpret a one-fingered swiping touch input gesture as the second gesture that may be utilized to pan the scalable map 808 at the second speed. The second speed may be provided at one or more respective speeds that are faster than the first speed that is utilized to pan the scalable map 808. In an alternate embodiment, the second gesture may be provided as one or more alternate gestures types that are provided by utilizing a predetermined number of the user's fingers, that may include, but may not be limited to, dragging gestures, turning gestures, pinching gestures, etc.

In an exemplary embodiment, based on the touchpad coordinates and touchpoint data communicated by the coordinate touch recognition module 126, the user interface management module 124 may determine a placement of one of the user's fingers on the surface 136 of the touchpad 108 while performing the swiping touch input gesture that is utilized as the second gesture. The user interface management module 124 may evaluate the touchpad coordinates of the areas on the surface 136 of the touchpad 108 that the swiping touch input gesture is provided. Additionally, the user interface management module 124 may analyze the touchpoint data pertaining to the swiping touch input gesture to determine the direction of swiping touch input gesture to pan the scalable map at the second speed.

In one embodiment, upon interpreting the touchpad coordinates and touchpoint data of the swiping touch input gesture, the user interface management module 124 may pan the scalable map at the second speed which is faster than the first speed to present additional/alternate portions of the page(s) of the scalable map 808 at the first portion 808a within the interactive map area 804 and the second portion 808b within the inactive map area of the map user interface 802 in accordance with the swiping touch input gesture received on the surface 136 of touchpad 108.

As an illustrative example, with reference again to FIG. 9A, if the user 134 provides the dragging or swiping touch input gesture in an upward direction or a downward direction, the first portion 808a may include one or more areas of the page 906 or the page 902 based on the direction and speed of the dragging or swiping touch input gesture. Similarly, if the user 134 provided the dragging or swiping touch input gesture in a rightward or leftward direction, the first portion 808a may include one or more areas of the page 904 or the page 906 based on the direction and speed of the dragging or swiping touch input gesture. In some embodiments, the user interface management module 124 may interpret the receipt of one or more specific gestures to pan the scalable map 808 over by one page. For example, if the user 134 provides the dragging touch input gesture with two fingers in an upward direction, the first portion 808a may include the page 906 and a portion of the page 909. In other words, the first portion 808a will present the scalable map 808 within the interactive map area 804 as being panned downward by one page.

Figure 9B:
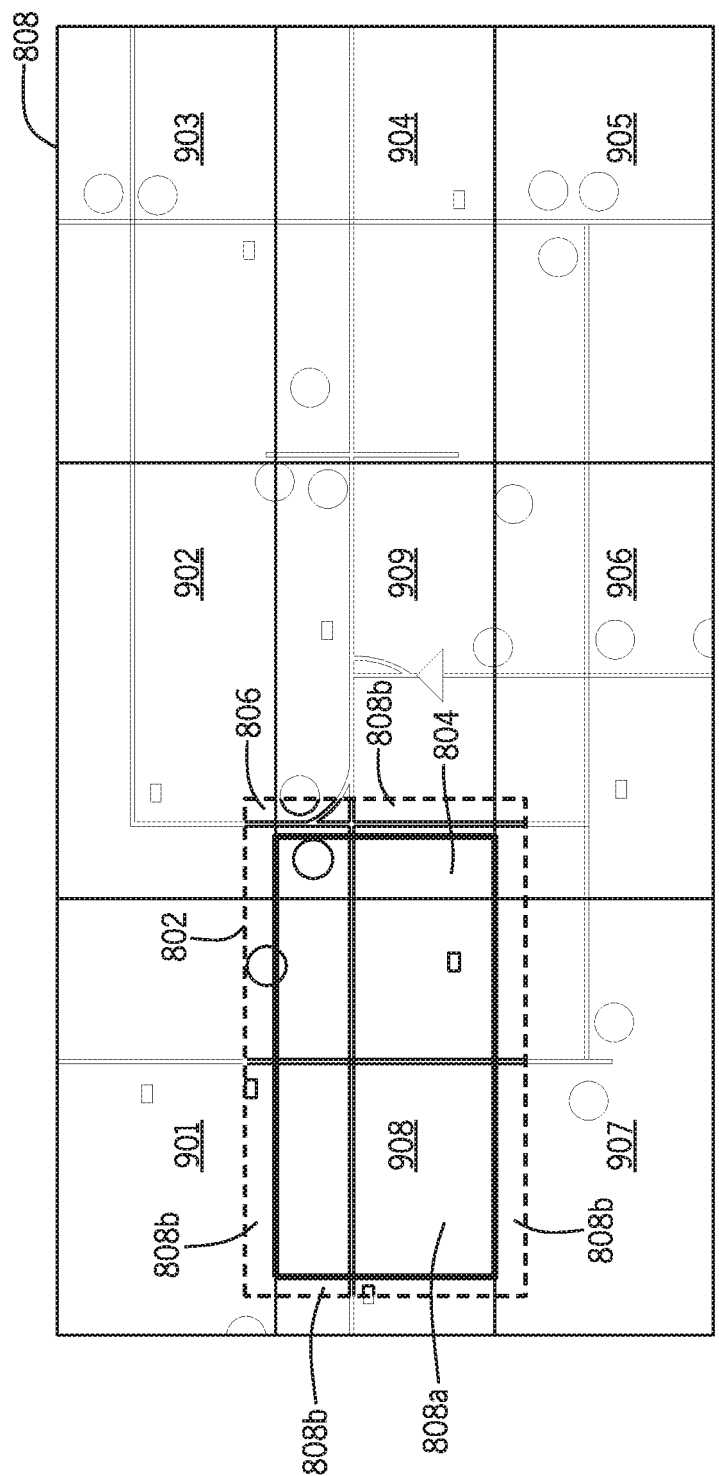
FIG. 9B is an illustrative embodiment that includes the view of the plurality of pages of the scalable map that includes a partial portion of a page of the scalable map according to an exemplary embodiment.

In one embodiment, a partial portion of the an additional/alternative page, may be presented while a partial portion of another page is still presented within the first portion 808a or the second portion 808b when the dragging or swiping touch input gesture is provided by the user 134. In other words, a portion of a page that is currently presented within the interactive map area 804 is still visible in addition to a portion of an additional page. FIG. 9B is an illustrative embodiment that includes the view of the plurality of pages of the scalable map that includes a partial portion of a page of the scalable map according to an exemplary embodiment. As shown in FIG. 9B, if the user 134 provides a dragging touch input gesture in a rightward direction on the surface 136 of the touchpad 108, based on the direction and the speed of the dragging touch input gesture, the first portion 808a may present a partial portion of the page 808 and a partial portion of the page 808. Consequently, the user 134 may view different portions of the scalable map 808 as desired by providing the first touch input gesture or the second touch input gesture.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for presenting and manipulating a map user interface, comprising:
    presenting the map user interface in a vehicle tracking mode;
    changing the map user interface from the vehicle tracking mode to an exploration mode, wherein the map user interface is changed to the exploration mode based on a touch input that is received on a surface of a touch pad and a scalable map is presented on the map user interface within the vehicle tracking mode,
    wherein the exploration mode includes a simultaneous display of a first zone and a second zone,
    wherein the map user interface is presented within the first zone and includes an interactive map area and an inactive map area and
    wherein a vehicle system user interface that is independent of the map user interface is presented within the second zone;

determining a first gesture on the touchpad that is provided at a plurality of touchpad coordinate areas of the touchpad that are mapped to a plurality of respective areas of the scalable map to pan a scalable map presented on the map user interface at a first speed; and determining a second gesture on the touchpad that is provided at a plurality of touchpad coordinate areas of the touchpad that are mapped to a plurality of respective areas of the scalable map to pan the scalable map presented on the map user interface at a second speed which is faster than the first speed, in response to determining the touch input on the touchpad, selecting at least one POI user interface object within a map of the map user interface and presenting one or more selectable detailed interface cards within the second zone rather than the vehicle system user interface, wherein one or more of the selectable detailed interface cards includes detailed information pertaining to a point of interest (POI) presented on the map user interface.

2. The computer-implemented method of claim 1, wherein the first gesture includes a dragging touch input gesture that is utilized to pan the scalable map presented on the first zone at the first speed as the second zone presents the vehicle system user interface that is independent of the map user interface and the second gesture includes a swiping touch input gesture that is utilized to pan the scalable map presented on the first zone at the second speed as the second zone presents the vehicle system user interface that is independent of the map user interface, wherein the dragging touch input gesture includes providing the touch input and dragging at least two fingers across the touchpad, wherein the swiping touch input gesture includes providing the touch input and swiping one finger across the touchpad.

3. The computer-implemented method of claim 1, wherein the second gesture pans the scalable map over by one page.

4. The computer-implemented method of claim 3, wherein a portion of a current page is still visible in addition to a portion of an additional page when the current page is panned by one page by the second gesture.

5. The computer-implemented method of claim 1, wherein the interactive map area includes a portion of the scalable map that receives inputs that include at least one of: the first gesture that is utilized to pan the scalable map at the first speed and the second gesture that is utilized to pan the scalable map at the second speed, wherein the inactive map area includes a portion of the scalable map that receives inputs that exclude the first gesture and the second gesture.

6. The computer-implemented method of claim 5, wherein the inactive map area includes a portion of the scalable map that receives a third gesture that is different from the first gesture and the second gesture, wherein the third gesture includes a click-input gesture.

7. The computer-implemented method of claim 5, wherein the inactive map area includes at least a portion of the scalable map of an additional page that will appear upon receiving at least one of: the first gesture and the second gesture on the touchpad.

8. The computer-implemented method of claim 5, wherein at least one user interface object is selectable within the interactive map area when a center portion of the at least one user interface object is within the interactive map area, wherein the at least one user interface object is partially presented within the inactive map area.

9. The computer-implemented method of claim 5, wherein the inactive map area includes a description associated with at least one point of interest icon that is enlarged within the interactive map area when a hovering input is received upon it.

10. A system for presenting and manipulating a map user interface comprising:

a memory storing instructions when executed by a processor cause the processor to:

present the map user interface in a vehicle tracking mode;

change the map user interface from the vehicle tracking mode to an exploration mode, wherein the map user interface is changed to the exploration mode based on a touch input that is received on a surface of a touch pad and a scalable map is presented on the map user interface within the vehicle tracking mode, wherein the exploration mode includes a simultaneous display of a first zone and a second zone, wherein the map user interface is presented within the first zone and includes an interactive map area and an inactive map area and wherein a vehicle system user interface that is independent of the map user interface is presented within the second zone;

determine a first gesture on the touchpad that is provided at a plurality of touchpad coordinate areas of the touchpad that are mapped to a plurality of respective areas of the scalable map to pan a scalable map presented on the map user interface at a first speed;

determine a second gesture on the touchpad that is provided at a plurality of touchpad coordinate areas of the touchpad that are mapped to a plurality of respective areas of the scalable map to pan the scalable map presented on the map user interface at a second speed which is faster than the first speed; and in response to determining the touch input on the touchpad, selecting at least one POI user interface object within a map of the map user interface and presenting one or more selectable detailed interface cards within the second zone rather than the vehicle system user interface, wherein one or more of the selectable detailed interface cards includes detailed information pertaining to a point of interest (POI) presented on the map user interface.

11. The system of claim 10, wherein the first gesture includes a dragging touch input gesture that is utilized to pan the scalable map presented on the first zone at the first speed as the second zone presents the vehicle system user interface that is independent of the map user interface and the second gesture includes a swiping touch input gesture that is utilized to pan the scalable map presented on the first zone at the second speed as the second zone presents the vehicle system user interface that is independent of the map user interface, wherein the dragging touch input gesture includes providing the touch input and dragging at least two fingers across the touchpad, wherein the swiping touch input gesture includes providing the touch input and swiping one finger across the touchpad.

12. The system of claim 10, wherein the second gesture pans the scalable map over by one page.

13. The system of claim 12, wherein a portion of a current page is still visible in addition to a portion of an additional page when the current page is panned by one page by the second gesture.

14. The system of claim 10, wherein the interactive map area includes a portion of the scalable map that receives inputs that include at least one of: the first gesture that is utilized to pan the scalable map at the first speed and the second gesture that is utilized to pan the scalable map at the second speed, wherein the inactive map area includes a portion of the scalable map that receives inputs that exclude the first gesture and the second gesture.

15. The system of claim 14, wherein the inactive map area includes a portion of the scalable map that receives a third gesture that is different from the first gesture and the second gesture, wherein the third gesture includes a click-input gesture.

16. The system of claim 14, wherein the inactive map area includes at least a portion of the scalable map of an additional page that will appear upon receiving at least one of: the first gesture and the second gesture on the touchpad.

17. The system of claim 14, wherein at least one user interface object is selectable within the interactive map area when a center portion of the at least one user interface object is within the interactive map area, wherein the at least one user interface object is partially presented within the inactive map area.

18. The system of claim 14, wherein the inactive map area includes a description associated with at least one point of interest icon that is enlarged within the interactive map area when a hovering input is received upon it.

19. A non-transitory computer readable storage medium storing instructions that when executed by a computer, which includes a processor perform a method, the method comprising:
- presenting a map user interface in a vehicle tracking mode;
- changing the map user interface from the vehicle tracking mode to an exploration mode, wherein the map user interface is changed to the exploration mode based on a touch input that is received on a surface of a touch pad and a scalable map is presented on the map user interface within the vehicle tracking mode,
- wherein the exploration mode includes a simultaneous display of a first zone and a second zone,
- wherein the map user interface is presented within the first zone and includes an interactive map area and an inactive map area and
- wherein a vehicle system user interface that is independent of the map user interface is presented within the second zone;
- determining a first gesture on the touchpad that is provided at a plurality of touchpad coordinate areas of the touchpad that are mapped to a plurality of respective areas of the scalable map to pan a scalable map presented on the map user interface at a first speed;
- determining a second gesture on the touchpad that is provided at a plurality of touchpad coordinate areas of the touchpad that are mapped to a plurality of respective areas of the scalable map to pan the scalable map presented on the map user interface at a second speed which is faster than the first speed; and
- in response to determining the touch input on the touchpad, selecting at least one POI user interface object within a map of the map user interface and presenting one or more selectable detailed interface cards within the second zone rather than the vehicle system user interface, wherein one or more of the selectable detailed interface cards includes detailed information pertaining to a point of interest (POI) presented on the map user interface.

* * * * *